United States Patent
Mishra et al.

(10) Patent No.: US 11,741,421 B2
(45) Date of Patent: Aug. 29, 2023

(54) SYSTEMS AND METHODS FOR OBTAINING REAL-TIME VARIABLE PRODUCT DATA FOR AN E-COMMERCE PLATFORM

(71) Applicant: Shopify Inc., Ottawa (CA)

(72) Inventors: Rohit Mishra, Toronto (CA); Charlie Elliott, Cambridge (CA)

(73) Assignee: Shopify Inc., Ottawa (CA)

( * ) Notice: Subject to any disclaimer, the term of this patent is extended or adjusted under 35 U.S.C. 154(b) by 609 days.

(21) Appl. No.: 16/904,714

(22) Filed: Jun. 18, 2020

(65) Prior Publication Data

US 2021/0398073 A1 Dec. 23, 2021

(51) Int. Cl.
*G06Q 10/0834* (2023.01)
*G06Q 10/087* (2023.01)
*G06Q 30/0283* (2023.01)
*G06Q 10/0835* (2023.01)

(52) U.S. Cl.
CPC ..... *G06Q 10/08345* (2013.01); *G06Q 10/087* (2013.01); *G06Q 10/08355* (2013.01); *G06Q 30/0283* (2013.01)

(58) Field of Classification Search
CPC ....... G06Q 10/08345; G06Q 10/08355; G06Q 10/087; G06Q 30/0283
See application file for complete search history.

(56) References Cited

U.S. PATENT DOCUMENTS

| | | | | |
|---|---|---|---|---|
| 11,157,930 | B1* | 10/2021 | Bachu | G06Q 30/0201 |
| 2007/0130090 | A1* | 6/2007 | Staib | G06Q 30/0222 |
| | | | | 705/14.69 |
| 2013/0151381 | A1* | 6/2013 | Klein | G06Q 10/087 |
| | | | | 705/27.1 |
| 2014/0058971 | A1* | 2/2014 | Muppirala | G06Q 10/0831 |
| | | | | 705/333 |
| 2015/0046361 | A1* | 2/2015 | Williams | G06Q 10/083 |
| | | | | 705/330 |
| 2015/0178820 | A1* | 6/2015 | Green | G06Q 30/0613 |
| | | | | 705/27.1 |
| 2020/0311758 | A1* | 10/2020 | Brosnan | G06Q 30/0257 |

OTHER PUBLICATIONS

Xun Xu, Jonathan E. Jackson. Examining customer channel selection intention in the omni-channel retail environment. International Journal of Production Economics. vol. 208, 2019, pp. 434-445, ISSN 0925-5273. (Year: 2019).*

* cited by examiner

*Primary Examiner* — Resha Desai
*Assistant Examiner* — Carter P Brockman
(74) *Attorney, Agent, or Firm* — Rowand LLP

(57) ABSTRACT

A computer-implemented method is disclosed. The method includes: receiving input of product value data for a product item and a data modifier for the product value data, the data modifier identifying a target margin value associated with the product item; determining at least one current inventory location for the product item; obtaining a shipping rate associated with shipping the product item to a geographical region from the at least one current inventory location; retrieving historical transfer value preference data for the geographical region; modifying at least one of the product value data, the shipping rate, or the target margin value based on the historical transfer value preference data; determining a transfer value of the product item based on the modified at least one of the product value data, the shipping rate, or the target margin value; and generating an indication of the transfer value of the product item.

20 Claims, 9 Drawing Sheets

SYSTEMS AND METHODS FOR OBTAINING REAL-TIME VARIABLE PRODUCT DATA FOR AN E-COMMERCE PLATFORM

FIELD

The present disclosure relates to computer-implemented e-commerce platforms and, in particular, to systems and methods for dynamic processing of product data on e-commerce platforms.

BACKGROUND

A merchant may use an e-commerce platform to sell products to customers. An e-commerce platform enables a merchant to provide product information for products that the merchant offers for sale and facilitates processing of purchase transactions by customers. The effectiveness of an e-commerce platform in supporting the sales activities of merchants relies significantly on the speed and accuracy with which information is provided to customers regarding prospective purchases. For example, it is important that an e-commerce platform be capable of rendering real-time results for queries relating to pricing and stock availability, inventory locations, delivery zones, and/or shipping rates.

In addition to facilitating purchase transactions, an e-commerce platform may allow merchants to control various elements of the sales process. For example, merchants may collect, store, and analyze customer engagement data via an e-commerce platform. Such analytics may be used by merchants to, for example, adjust product data, update user interface designs, and manage order processing and fulfilment processes.

BRIEF DESCRIPTION OF THE DRAWINGS

Embodiments will be described, by way of example only, with reference to the accompanying figures wherein.

DETAILED DESCRIPTION

Figure 1:
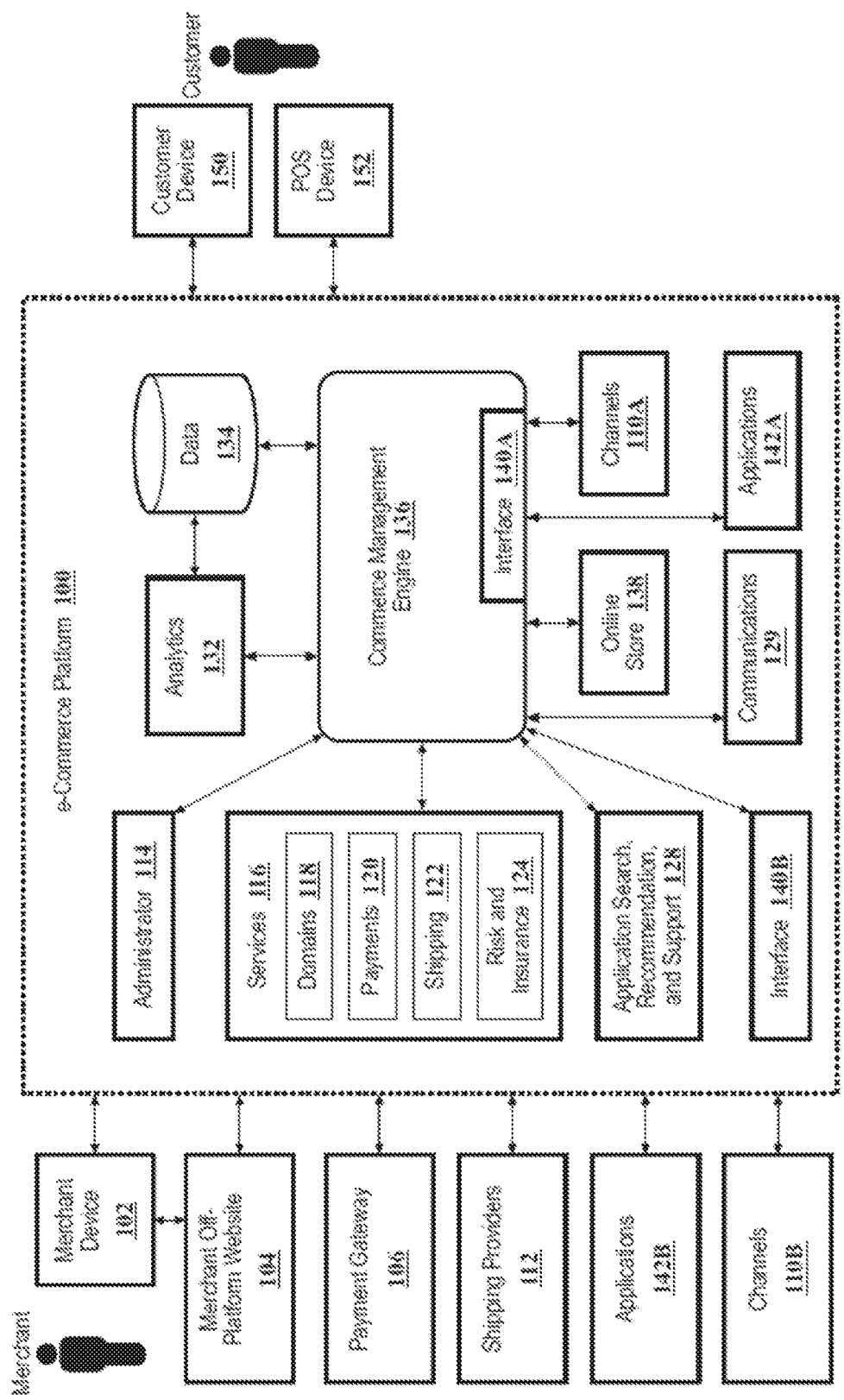
FIG. 1 is a block diagram of an e-commerce platform, according to an example embodiment.

In one aspect, the present application describes a computer-implemented method for generating transfer values for a product item associated with a merchant account. The method includes: receiving, from a merchant device associated with a merchant account, input of product value data for a product item and a data modifier for the product value data, the data modifier identifying a target margin value associated with the product item; determining at least one current inventory location for the product item based on tracking data associated with inventory of the product item; obtaining a shipping rate associated with shipping the product item to a geographical region from the at least one current inventory location; retrieving, from memory, historical transfer value preference data for the geographical region; modifying at least one of the product value data, the shipping rate, or the target margin value based on the historical transfer value preference data retrieved; determining a transfer value of the product item for the geographical region based on the modified at least one of the product value data, the shipping rate, or the target margin value; generating an indication of the transfer value of the product item for the geographical region; and providing the indication to a computing device for display on the computing device.

In some implementations, the method may further include receiving, from the merchant device, user input identifying the geographical region.

In some implementations, providing the indication to the client device may include: receiving, via a client device, a request to retrieve transfer value data for the product item; in response to receiving the request: determining a device location associated with the client device; determining that the device location is within the geographical region; and automatically transmitting, to the client device, the indication of the transfer value of the product item for the geographical region.

In some implementations, modifying at least one of the product value data, the shipping rate, or the target margin value may include determining adjusted product value data for the product item and an adjusted shipping rate for the product item based on the historical transfer value preference data for the geographical region.

In some implementations, the method may include determining an amount of increase in product value of the product item and an amount of decrease in shipping rate for the product item.

In some implementations, the historical transfer value preference data may indicate a tolerance range for a shipping rate for the product item, and the adjusted shipping rate may be determined based on the tolerance range for the shipping rate.

In some implementations, the historical transfer value preference data may indicate preferred representation of transfer values in terms of constituent components, and the indication of the transfer values may be displayed on the computing device in accordance with the historical transfer value preference data.

In some implementations, the method may further include retrieving, from a database, transfer value preference data for a plurality of defined geographical subregions, and the geographical region may comprise a grouping of the plurality of defined geographical subregions based on the transfer value preference data.

In some implementations, obtaining the shipping rate may include querying a database to retrieve a real-time shipping rate associated with shipping the product item to the geographical region.

In some implementations, modifying at least one of the product value data, the shipping rate, or the target margin value may include determining adjustments to a product value of the product item for complying with the target margin value associated with the product item.

In another aspect, the present application discloses a transfer value generation engine that includes a processor, a database storing data for a plurality of product items associated with a merchant account, and a memory. The memory stores computer-executable instructions that, when executed by the processor, are to cause the processor to: receive, from a merchant device associated with a merchant account, input of product value data for a product item and a data modifier for the product value data, the data modifier identifying a target margin value associated with the product item; determine at least one current inventory location for the product item based on tracking data associated with inventory of the product item; obtain a shipping rate associated with shipping the product item to a geographical region from the at least one current inventory location; retrieve, from memory, historical transfer value preference data for the geographical region; modify at least one of the product value data, the shipping rate, or the target margin value based on the historical transfer value preference data retrieved; determine a transfer value of the product item for the geographical region based on the modified at least one of the product value data, the shipping rate, or the target margin value; generate an indication of the transfer value of the product item for the geographical region; and provide the indication to a computing device for display on the computing device.

In another aspect, the present application discloses a computer-implemented method. The method includes: receiving, via a merchant device associated with a merchant account, input of product value data for a product item and a data modifier for the product value data, the data modifier identifying a target margin value associated with the product item; determining at least one current inventory location for the product item based on tracking data associated with inventory of the product item; retrieving, from memory, historical transfer value preference data for a geographical region, the historical transfer value preference data indicating localized preference data for, at least, product value and shipping rates for one or more product items; determining two or more adjusted product values for the product item and two or more adjusted shipping rates associated with shipping the product item to the geographical region based on the historical transfer value preference data, the shipping rates determined based on a current inventory location for the product item; transmitting for display, on two or more customer devices associated with the geographical region, different sets of product data for the product item, each set including a different combination of the adjusted product values and the adjusted shipping rates; detecting transaction events for the product item based on input received via the two or more customer devices in response to the different sets of product data transmitted; and outputting the product item and a target set of product data for the product item for the geographical region to a merchant device for display, the target set of product data selected based on the detected transaction events.

In some implementations, outputting the product item and the target set of product data for the product item for the geographical region to the merchant device for display may include: transmitting, to the merchant device, a request for confirmation that, for the geographical region, the product item is to be associated with the target set of product data; and receiving, via the merchant device, input confirming that, for the geographical region, the product item is to be associated with the target set of product data.

In some implementations, the method may further include: responsive to receiving the input confirming that, for the geographical region, the product item is to be associated with the target set of product data, storing, in memory, an association between the product item and the target set of product data for the geographical region.

In some implementations, the two or more adjusted product values and the two or more adjusted shipping rates may be determined based on the target margin value for the product item.

In some implementations, the two or more adjusted product values may be within a first range of product values and the two or more adjusted shipping rates may be within a second range of shipping rates, the first range and the second range being determined based on the historical transfer value preference data and the target margin value for the product item.

In some implementations, detecting the transaction events may include detecting a transaction event for the product item associated with at least one of the different sets of product data transmitted to the two or more customer devices.

In some implementations, the method may further include: determining, for the geographical region, recommended transfer value data indicating at least a recommended adjusted product value for the product item and a recommended shipping rate for the product item; and transmitting, to the merchant device, the recommended transfer value data.

In some implementations, the recommended transfer value data may indicate tax and duties information associated with the product item.

In some implementations, the method may further include: receiving, via the merchant device, input indicating approval of the recommended adjusted product value and the recommended shipping rate for the geographical region; and providing, via a user interface of an e-commerce system, product data for the product item for the geographical region based on the recommended adjusted product value and the recommended shipping rate.

In some implementations, the method may further include: receiving, via the merchant device, input requesting a change to at least one of the recommended adjusted product value or the recommended shipping rate for the geographical region; and providing, via a user interface of an e-commerce system, product data for the product item for the geographical region based on the adjusted product value and shipping rate reflecting the requested change.

In some implementations, the method may further include: receiving, via the merchant device, input indicating rejection of at least one of the recommended adjusted product value or the recommended shipping rate for the geographical region; obtaining alternative recommended transfer value data indicating alternatives for at least one of the recommended adjusted product value or the recommended shipping rate; and transmitting, to the merchant device, the alternative recommended transfer value data.

In another aspect, the present application discloses an e-commerce system that includes a processor, a database storing data for a plurality of product items associated with a merchant account, and a memory. The memory stores computer-executable instructions that, when executed by the processor, are to cause the processor to: receive, via a merchant device associated with a merchant account, input of product value data for a product item and a data modifier for the product value data, the data modifier identifying a target margin value associated with the product item; determine at least one current inventory location for the product item based on tracking data associated with inventory of the product item; retrieve, from memory, historical transfer value preference data for a geographical region, the historical transfer value preference data indicating localized preference data for, at least, product value and shipping rates for one or more product items; determine two or more adjusted product values for the product item and two or more adjusted shipping rates associated with shipping the product item to the geographical region based on the historical transfer value preference data, the shipping rates determined based on a current inventory location for the product item; transmit for display, on two or more customer devices associated with the geographical region, different sets of product data for the product item, each set including a different combination of the adjusted product values and the adjusted shipping rates; detect transaction events for the product item based on input received via the two or more customer devices in response to the different sets of product data transmitted; and store, in memory, an association between the product item and a target set of product data for the product item for the geographical region, the target set of product data selected based on the detected transaction events.

In another aspect, the present application discloses a non-transitory computer-readable medium storing processor-executable instruction that, when executed by one or more processors, are to cause the one or more processors to carry out at least some of the operations of a method described herein.

Other example embodiments of the present disclosure will be apparent to those of ordinary skill in the art from a review of the following detailed descriptions in conjunction with the drawings.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . and . . . " is intended to cover any one or more of the listed elements, including any one of the listed elements alone, any sub-combination, or all of the elements, without necessarily excluding any additional elements, and without necessarily requiring all of the elements.

In the present application, the term "product data" refers generally to data associated with products that are offered for sale on an e-commerce platform. The product data for a product may include, without limitation, product specification, product category, manufacturer information, pricing details, stock availability, inventory location(s), expected delivery time, shipping rates, and tax and tariff information. While some product data may include static information (e.g. manufacturer name, product dimensions, etc.), other product data may be modified by a merchant on the e-commerce platform. For example, the offer price of a product may be varied by the merchant at any time. In particular, the merchant may set the product's offer price to a specific value and update said offer price as desired. Once an order is placed for the product at a certain price by a customer, the merchant commits to pricing; that is, the product price may not be changed for the placed order. Product data that a merchant may control (e.g. change, update, etc.) will be referred to as variable product data. More specifically, variable product data refers to product data that may be changed automatically or at the discretion of the merchant offering the product.

Example E-Commerce Platform

In some embodiments, the methods disclosed herein may be performed on or in association with an e-commerce platform. An example of an e-commerce platform will now be described.

FIG. 1 illustrates an e-commerce platform 100, according to one embodiment. The e-commerce platform 100 may be used to provide merchant products and services to customers. While the present disclosure contemplates using the apparatus, system, and process to purchase products and services, for simplicity the description herein will refer to products. All references to products throughout this disclosure should be understood to be references to products and/or services, including physical products, digital content, tickets, subscriptions, services to be provided, and the like.

While the disclosure throughout contemplates that a "merchant" and a "customer" may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to "merchants" and "customers", and describes their roles as such, the e-commerce platform 100 should be understood to more generally support users in an e-commerce environment, and all references to merchants and customers throughout this disclosure should also be understood to be references to users, such as where a user is a merchant-user (e.g. a seller, retailer, wholesaler, or provider of products), a customer-user (e.g. a buyer, purchase agent, or user of products), a prospective user (e.g. a user browsing and not yet committed to a purchase, a user evaluating the e-commerce platform 100 for potential use in marketing and selling products, and the like), a service provider user (e.g. a shipping provider 112, a financial provider, and the like), a company or corporate user (e.g. a company representative for purchase, sales, or use of products, an enterprise user, a customer relations or customer management agent, and the like), an information technology user, a computing entity user (e.g. a computing bot for purchase, sales, or use of products), and the like.

The e-commerce platform 100 may provide a centralized system for providing merchants with online resources and facilities for managing their business. The facilities described herein may be deployed, in part or in whole, through a machine that executes computer software, modules, program codes, and/or instructions on one or more processors which may be part of or external to the platform 100. Merchants may utilize the e-commerce platform 100 for managing commerce with customers, such as by implementing an e-commerce experience with customers through an online store 138, through channels 110A-B, through POS devices 152 in physical locations (e.g. a physical storefront or other location such as through a kiosk, terminal, reader, printer, 3D printer, and the like), by managing their business through the e-commerce platform 100, and by interacting with customers through a communications facility 129 of the e-commerce platform 100, or any combination thereof. A merchant may utilize the e-commerce platform 100 as a sole commerce presence with customers, or in conjunction with other merchant commerce facilities, such as through a physical store (e.g. "brick-and-mortar" retail stores), a merchant off-platform website 104 (e.g. a commerce Internet website or other internet or web property or asset supported by or on behalf of the merchant separately from the e-commerce platform), and the like. However, even such other merchant commerce facilities may be incorporated into the e-commerce platform, such as where POS devices 152 in a physical store of a merchant are linked to the e-commerce platform 100, where a merchant off-platform website 104 is tied to the e-commerce platform 100, such as through "buy buttons" that link content from the merchant off platform website 104 to the online store 138, and the like.

The online store 138 may represent a multitenant facility comprising a plurality of virtual storefronts. In some embodiments, merchants may manage one or more storefronts in the online store 138, such as through a merchant device 102 (e.g. computer, laptop computer, mobile computing device, and the like), and offer products to customers through a number of different channels 110A-B (e.g. an online store 138; a physical storefront through a POS device 152; electronic marketplace, through an electronic buy button integrated into a website or social media channel such as on a social network, social media page, social media messaging system; and the like). A merchant may sell across channels 110A-B and then manage their sales through the e-commerce platform 100, where channels 110A may be provided internal to the e-commerce platform 100 or from outside the e-commerce channel 110B. A merchant may sell in their physical retail store, at pop ups, through wholesale, over the phone, and the like, and then manage their sales through the e-commerce platform 100. A merchant may employ all or any combination of these, such as maintaining a business through a physical storefront utilizing POS devices 152, maintaining a virtual storefront through the online store 138, and utilizing a communication facility 129 to leverage customer interactions and analytics 132 to improve the probability of sales. Throughout this disclosure, the terms "online store" and "storefront" may be used synonymously to refer to a merchant's online e-commerce offering presence through the e-commerce platform 100, where an online store 138 may refer to the multitenant collection of storefronts supported by the e-commerce platform 100 (e.g. for a plurality of merchants) or to an individual merchant's storefront (e.g. a merchant's online store).

In some embodiments, a customer may interact through a customer device 150 (e.g. computer, laptop computer, mobile computing device, and the like), a POS device 152 (e.g. retail device, a kiosk, an automated checkout system, and the like), or any other commerce interface device known in the art. The e-commerce platform 100 may enable merchants to reach customers through the online store 138, through POS devices 152 in physical locations (e.g. a merchant's storefront or elsewhere), to promote commerce with customers through dialog via electronic communication facility 129, and the like, providing a system for reaching customers and facilitating merchant services for the real or virtual pathways available for reaching and interacting with customers.

In some embodiments, and as described further herein, the e-commerce platform 100 may be implemented through a processing facility including a processor and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant devices 102, payment gateways 106, application developers, channels 110A-B, shipping providers 112, customer devices 150, point of sale devices 152, and the like. The e-commerce platform 100 may be implemented as a cloud computing service, a software as a service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted (e.g. accessed by users using a client, such as a thin client, via a web browser or other application, accessed through by POS devices, and the like). In some embodiments, elements of the e-commerce platform 100 may be implemented to operate on various platforms and operating systems, such as iOS™, Android™, on the web, and the like (e.g. the administrator 114 being implemented in multiple instances for a given online store for iOS™, Android™, and for the web, each with similar functionality).

In some embodiments, the online store 138 may be served to a customer device 150 through a webpage provided by a server of the e-commerce platform 100. The server may receive a request for the webpage from a browser or other application installed on the customer device 150, where the browser (or other application) connects to the server through an IP address, the IP address obtained by translating a domain name. In return, the server sends back the requested webpage. Webpages may be written in or include Hypertext Markup Language (HTML), template language, JavaScript, and the like, or any combination thereof. For instance, HTML is a computer language that describes static information for the webpage, such as the layout, format, and content of the webpage. Website designers and developers may use the template language to build webpages that combine static content, which is the same on multiple pages, and dynamic content, which changes from one page to the next. A template language may make it possible to re-use the static elements that define the layout of a webpage, while dynamically populating the page with data from an online store. The static elements may be written in HTML, and the dynamic elements written in the template language. The template language elements in a file may act as placeholders, such that the code in the file is compiled and sent to the customer device 150, and then the template language is replaced by data from the online store 138, such as when a theme is installed. The template and themes may consider tags, objects, and filters. The client device web browser (or other application) then renders the page accordingly.

In some embodiments, online stores 138 may be served by the e-commerce platform 100 to customers, where customers can browse and purchase the various products available (e.g. add products to a cart, purchase immediately through a buy-button, and the like). Online stores 138 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their online store 138. Merchants may customize the look and feel of their website through a theme system, such as where merchants can select and change the look and feel of their online store 138 by changing their theme while having the same underlying product and business data shown within the online store's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store 138 may implement a content management system for website content. Merchants may author blog posts or static pages and publish them to their online store 138, such as through blogs, articles, and the like, as well as configure navigation menus. Merchants may upload images (e.g. for products), videos, content, data, and the like to the e-commerce platform 100, such as for storage by the system (e.g. as data 134). In some embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110A-B, including the online store 138, over the telephone, as well as through physical POS devices 152 as described herein. The e-commerce platform 100 may include business support services 116, an administrator 114, and the like associated with running an on-line business, such as providing a domain service 118 associated with their online store, payment services 120 for facilitating transactions with a customer, shipping services 122 for providing customer shipping options for purchased products, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may provide for integrated shipping services 122 (e.g. through an e-commerce platform shipping facility or through a third-party shipping carrier), such as providing merchants with real-time updates, tracking, automatic rate calculation, bulk order preparation, label printing, and the like.

Figure 2:
FIG. 2 is an example of a home page of an administrator, according to an example embodiment.

FIG. 2 depicts a non-limiting embodiment for a home page of an administrator 114, which may show information about daily tasks, a store's recent activity, and the next steps a merchant can take to build their business. In some embodiments, a merchant may log in to administrator 114 via a merchant device 102 such as from a desktop computer or mobile device, and manage aspects of their online store 138, such as viewing the online store's 138 recent activity, updating the online store's 138 catalog, managing orders, recent visits activity, total orders activity, and the like. In some embodiments, the merchant may be able to access the different sections of administrator 114 by using the sidebar, such as shown on FIG. 2. Sections of the administrator 114 may include various interfaces for accessing and managing core aspects of a merchant's business, including orders, products, customers, available reports and discounts. The administrator 114 may also include interfaces for managing sales channels for a store including the online store, mobile application(s) made available to customers for accessing the store, POS devices, and/or a buy button. The administrator 114 may also include interfaces for managing applications installed on the merchant's account, and settings applied to a merchant's online store 138 and account. A merchant may use a search bar to find products, pages, or other information. Depending on the device 102 or software application the merchant is using, they may be enabled for different functionality through the administrator 114. For instance, if a merchant logs in to the administrator 114 from a browser, they may be able to manage all aspects of their online store 138. If the merchant logs in from their mobile device (e.g. via a mobile application), they may be able to view all or a subset of the aspects of their online store 138, such as viewing the online store's 138 recent activity, updating the online store's 138 catalog, managing orders, and the like.

More detailed information about commerce and visitors to a merchant's online store 138 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110A-B from different periods of time (e.g. days, weeks, months, and the like), such as by using drop-down menus. An overview dashboard may be provided for a merchant that wants a more detailed view of the store's sales and engagement data. An activity feed in the home metrics section may be provided to illustrate an overview of the activity on the merchant's account. For example, by clicking on a "view all recent activity" dashboard button, the merchant may be able to see a longer feed of recent activity on their account. A home page may show notifications about the merchant's online store 138, such as based on account status, growth, recent customer activity, and the like. Notifications may be provided to assist a merchant with navigating through a process, such as capturing a payment, marking an order as fulfilled, archiving an order that is complete, and the like.

The e-commerce platform 100 may provide for a communications facility 129 and associated merchant interface for providing electronic communications and marketing, such as utilizing an electronic messaging aggregation facility for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a financial facility 120 for secure financial transactions with customers, such as through a secure card server environment. The e-commerce platform 100 may store credit card information, such as in payment card industry data (PCI) environments (e.g. a card server), to reconcile financials, bill merchants, perform automated clearing house (ACH) transfers between an e-commerce platform 100 financial institution account and a merchant's bank account (e.g. when using capital), and the like. These systems may have Sarbanes-Oxley Act (SOX) compliance and a high level of diligence required in their development and operation. The financial facility 120 may also provide merchants with financial support, such as through the lending of capital (e.g. lending funds, cash advances, and the like) and provision of insurance. In addition, the e-commerce platform 100 may provide for a set of marketing and partner services and control the relationship between the e-commerce platform 100 and partners. They may also connect and onboard new merchants with the e-commerce platform 100. These services may enable merchant growth by making it easier for merchants to work across the e-commerce platform 100. Through these services, merchants may be provided help facilities via the e-commerce platform 100.

In some embodiments, online store 138 may support a great number of independently administered storefronts and process a large volume of transactional data on a daily basis for a variety of products. Transactional data may include customer contact information, billing information, shipping information, information on products purchased, information on services rendered, and any other information associated with business through the e-commerce platform 100. In some embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

Referring again to FIG. 1, in some embodiments the e-commerce platform 100 may be configured with a commerce management engine 136 for content management, task automation, and data management to enable support and services to the plurality of online stores 138 (e.g. related to products, inventory, customers, orders, collaboration, suppliers, reports, financials, risk and fraud, and the like), but be extensible through applications 142A-B that enable greater flexibility and custom processes required for accommodating an ever-growing variety of merchant online stores, POS devices, products, and services. The applications 142A may be provided internal to the e-commerce platform 100 or applications 142B may be provided from outside the e-commerce platform 100. In some embodiments, an application 142A may be provided by the same party providing the platform 100 or by a different party. In some embodiments, an application 142B may be provided by the same party providing the platform 100 or by a different party. The commerce management engine 136 may be configured for flexibility and scalability through portioning (e.g. sharding) of functions and data, such as by customer identifier, order identifier, online store identifier, and the like. The commerce management engine 136 may accommodate store-specific business logic and in some embodiments, may incorporate the administrator 114 and/or the online store 138.

The commerce management engine 136 includes base or "core" functions of the e-commerce platform 100, and as such, as described herein, not all functions supporting online stores 138 may be appropriate for inclusion. For instance, functions for inclusion in the commerce management engine 136 may need to exceed a core functionality threshold through which it may be determined that the function is core to a commerce experience (e.g. common to a majority of online store activities, such as across channels, administrator interfaces, merchant locations, industries, product types, and the like), is re-usable across online stores 138 (e.g. functions that can be re-used/modified across core functions), limited to the context of a single online store 138 at a time (e.g. implementing an online store 'isolation principle', where code should not be able to interact with multiple online stores 138 at a time, ensuring that online stores 138 cannot access each other's data), provide a transactional workload, and the like. Maintaining control of what functions are implemented may enable the commerce management engine 136 to remain responsive, as many required features are either served directly by the commerce management engine 136 or enabled through an interface 140A-B, such as by extension through an application programming interface (API) connection to applications 142A-B and channels 110A-B, where interfaces 140A may be provided to applications 142A and/or channels 110A inside the e-commerce platform 100 or through interfaces 140B provided to applications 142B and/or channels 110B outside the e-commerce platform 100. Generally, the platform 100 may include interfaces 140A-B (which may be extensions, connectors, APIs, and the like) which facilitate connections to and communications with other platforms, systems, software, data sources, code and the like. Such interfaces 140A-B may be an interface 140A of the commerce management engine 136 or an interface 140B of the platform 100 more generally. If care is not given to restricting functionality in the commerce management engine 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the commerce management engine 136 may be configured to maintain responsiveness, such as through configuration that utilizes timeouts, queues, back-pressure to prevent degradation, and the like.

Although isolating online store data is important to maintaining data privacy between online stores 138 and merchants, there may be reasons for collecting and using cross-store data, such as for example, with an order risk assessment system or a platform payment facility, both of which require information from multiple online stores 138 to perform well. In some embodiments, rather than violating the isolation principle, it may be preferred to move these components out of the commerce management engine 136 and into their own infrastructure within the e-commerce platform 100.

In some embodiments, the e-commerce platform 100 may provide for a platform payment facility 120, which is another example of a component that utilizes data from the commerce management engine 136 but may be located outside so as to not violate the isolation principle. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a rapid and accurate checkout. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from an online store's checkout, allowing information to be made available globally across online stores 138. It would be difficult and error prone for each online store 138 to be able to connect to any other online store 138 to retrieve the payment information stored there. Thus, the platform payment facility may be implemented external to the commerce management engine 136.

For those functions that are not included within the commerce management engine 136, applications 142A-B provide a way to add features to the e-commerce platform 100. Applications 142A-B may be able to access and modify data on a merchant's online store 138, perform tasks through the administrator 114, create new flows for a merchant through a user interface (e.g. that is surfaced through extensions/API), and the like. Merchants may be enabled to discover and install applications 142A-B through application search, recommendations, and support 128. In some embodiments, core products, core extension points, applications, and the administrator 114 may be developed to work together. For instance, application extension points may be built inside the administrator 114 so that core features may be extended by way of applications, which may deliver functionality to a merchant through the extension.

In some embodiments, applications 142A-B may deliver functionality to a merchant through the interface 140A-B, such as where an application 142A-B is able to surface transaction data to a merchant (e.g. app: "engine, surface my app data in mobile and web admin using the embedded app SDK"), and/or where the commerce management engine 136 is able to ask the application to perform work on demand (e.g. engine: "app, give me a local tax calculation for this checkout").

Applications 142A-B may support online stores 138 and channels 110A-B, provide for merchant support, integrate with other services, and the like. Where the commerce management engine 136 may provide the foundation of services to the online store 138, the applications 142A-B may provide a way for merchants to satisfy specific and sometimes unique needs. Different merchants will have different needs, and so may benefit from different applications 142A-B. Applications 142A-B may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142A-B may be connected to the commerce management engine 136 through an interface 140A-B, such as by utilizing APIs to expose the functionality and data available through and within the commerce management engine 136 to the functionality of applications (e.g. through REST, GraphQL, and the like). For instance, the e-commerce platform 100 may provide API interfaces 140A-B to merchant and partner-facing products and services, such as application extensions, process flow services, developer-facing resources, and the like. With customers more frequently using mobile devices for shopping, applications 142A-B related to mobile use may benefit from more extensive use of APIs to support the related growing commerce traffic. The flexibility offered through use of applications and APIs (e.g. as offered for application development) enable the e-commerce platform 100 to better accommodate new and unique needs of merchants (and internal developers through internal APIs) without requiring constant change to the commerce management engine 136, thus providing merchants what they need when they need it. For instance, shipping services 122 may be integrated with the commerce management engine 136 through a shipping or carrier service API, thus enabling the e-commerce platform 100 to provide shipping service functionality without directly impacting code running in the commerce management engine 136.

Many merchant problems may be solved by letting partners improve and extend merchant workflows through application development, such as problems associated with back-office operations (merchant-facing applications 142A-B) and in the online store 138 (customer-facing applications 142A-B). As a part of doing business, many merchants will use mobile and web related applications on a daily basis for back-office tasks (e.g. merchandising, inventory, discounts, fulfillment, and the like) and online store tasks (e.g. applications related to their online shop, for flash-sales, new product offerings, and the like), where applications 142A-B, through extension/API 140A-B, help make products easy to view and purchase in a fast growing marketplace. In some embodiments, partners, application developers, internal applications facilities, and the like, may be provided with a software development kit (SDK), such as through creating a frame within the administrator 114 that sandboxes an application interface. In some embodiments, the administrator 114 may not have control over or be aware of what happens within the frame. The SDK may be used in conjunction with a user interface kit to produce interfaces that mimic the look and feel of the e-commerce platform 100, such as acting as an extension of the commerce management engine 136.

Applications 142A-B that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the commerce management engine 136, for synchronizing a local database, notifying an external integration partner, and the like. Update events may enable this functionality without having to constantly poll the commerce management engine 136 to check for updates, such as through an update event subscription. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g. via the API 140A-B). In some embodiments, update events may be queued and processed asynchronously from a state change that triggered them, which may produce an update event notification that is not distributed in real-time.

In some embodiments, the e-commerce platform 100 may provide application search, recommendation and support 128 functionalities. Application search, recommendation and support 128 may include developer products and tools to aid in the development of applications, an application dashboard (e.g. to provide developers with a development interface, to administrators for management of applications, to merchants for customization of applications, and the like), facilities for installing and providing permissions with respect to providing access to an application 142A-B (e.g. for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, a description of core application capabilities within the commerce management engine 136, and the like. These support facilities may be utilized for application development performed by any entity, including the merchant developing their own application 142A-B, a third-party developer developing an application 142A-B (e.g. contracted by a merchant, developed on their own to offer to the public, contracted for use in association with the e-commerce platform 100, and the like), or an application 142A or 142B being developed by internal personal resources associated with the e-commerce platform 100. In some embodiments, applications 142A-B may be assigned an application identifier (ID), such as for linking to an application (e.g. through an API), searching for an application, making application recommendations, and the like.

The commerce management engine 136 may include base functions of the e-commerce platform 100 and expose these functions through APIs 140A-B to applications 142A-B. The APIs 140A-B may enable different types of applications built through application development. Applications 142A-B may be capable of satisfying a great variety of needs for merchants but may be grouped roughly into three categories: customer-facing applications, merchant-facing applications, integration applications, and the like. Customer-facing applications 142A-B may include online store 138 or channels 110A-B that are places where merchants can list products and have them purchased (e.g. the online store, applications for flash sales (e.g. merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g. through applications related to the web or website or to mobile devices), run their business (e.g. through applications related to POS devices), to grow their business (e.g. through applications related to shipping (e.g. drop shipping), use of automated agents, use of process flow development and improvements), and the like. Integration applications may include applications that provide useful integrations that participate in the running of a business, such as shipping providers 112 and payment gateways.

In some embodiments, an application developer may use an application proxy to fetch data from an outside location and display it on the page of an online store 138. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142A-B so that the commerce management engine 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products on a channel 110A-B. A channel 110A-B is a place where customers can view and buy products. In some embodiments, channels 110A-B may be modeled as applications 142A-B (a possible exception being the online store 138, which is integrated within the commence management engine 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g. a "default variant" is created for a product without any options). To facilitate browsing and management, products may be grouped into collections, provided product identifiers (e.g. stock keeping unit (SKU)) and the like. Collections of products may be built by either manually categorizing products into one (e.g. a custom collection), by building rulesets for automatic classification (e.g. a smart collection), and the like. Products may be viewed as 2D images, 3D images, rotating view images, through a virtual or augmented reality interface, and the like.

In some embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g. for point of sale). Checkouts may be created from a cart and record a customer's information such as email address, billing, and shipping details. On checkout, the merchant commits to pricing. If the customer inputs their contact information but does not proceed to payment, the e-commerce platform 100 may provide an opportunity to re-engage the customer (e.g. in an abandoned checkout feature). For those reasons, checkouts can have much longer lifespans than carts (hours or even days) and are therefore persisted. Checkouts may calculate taxes and shipping rates based on the customer's shipping address. Checkout may delegate the calculation of taxes to a tax component and the calculation of shipping rates to a delivery component. A pricing component may enable merchants to create discount codes (e.g. "secret" strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g. a set of prerequisites that when met imply a set of entitlements). For instance, prerequisites may be items such as "the order subtotal is greater than $100" or "the shipping rate is under $10", and entitlements may be items such as "a 20% discount on the whole order" or "$10 off products X, Y, and Z".

Customers then pay for the content of their cart resulting in the creation of an order for the merchant. Channels 110A-B may use the commerce management engine 136 to move money, currency, or a store of value (such as dollars or a cryptocurrency) to and from customers and merchants. Communication with the various payment providers (e.g. online payment systems, mobile payment systems, digital wallet, credit card gateways, and the like) may be implemented within a payment processing component. The actual interactions with the payment gateways 106 may be provided through a card server environment. In some embodiments, the payment gateway 106 may accept international payment, such as integrating with leading international credit card processors. The card server environment may include a card server application, card sink, hosted fields, and the like. This environment may act as the secure gatekeeper of the sensitive credit card information. In some embodiments, most of the process may be orchestrated by a payment processing job. The commerce management engine 136 may support many other payment methods, such as through an offsite payment gateway 106 (e.g. where the customer is redirected to another website), manually (e.g. cash), online payment methods (e.g. online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g. order line items, shipping line items, and the like) and the customer agrees to provide payment (including taxes). This process may be modeled in a sales component. Channels 110A-B that do not rely on commerce management engine 136 checkouts may use an order API to create orders. Once an order is created, an order confirmation notification may be sent to the customer and an order placed notification sent to the merchant via a notification component. Inventory may be reserved when a payment processing job starts, to avoid over-selling (e.g. merchants may control this behavior from the inventory policy of each variant). Inventory reservation may have a short time span (e.g. minutes) and may need to be very fast and scalable to support flash sales (e.g. a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order, or incoming from an inventory transfer component (e.g. from a vendor).

The merchant may then review and fulfill (or cancel) the order. A review component may implement a business process merchants use to ensure orders are suitable for fulfillment before actually fulfilling them. Orders may be fraudulent, require verification (e.g. ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g. credit card information) or wait to receive it (e.g. via a bank transfer, check, and the like) and mark the order as paid. The merchant may now prepare the products for delivery. In some embodiments, this business process may be implemented by a fulfillment component. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g. at merchant managed locations) used when the merchant picks and packs the products in a box, purchase a shipping label and input its tracking number, or just mark the item as fulfilled. A custom fulfillment service may send an email (e.g. a location that doesn't provide an API connection). An API fulfillment service may trigger a third party, where the third-party application creates a fulfillment record. A legacy fulfillment service may trigger a custom API call from the commerce management engine 136 to a third party (e.g. fulfillment by Amazon). A gift card fulfillment service may provision (e.g. generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. Conditions may be imposed on returns, such as requiring that they be initiated within a set period (e.g. 30 days) of the original order date. The business process merchants may go through to "un-sell" an item may be implemented by a return component. Returns may consist of a variety of different actions, such as: a re-stock, where the product that was sold actually comes back into the business and is sellable again; a refund, where the money that was collected from the customer is partially or fully returned; an accounting adjustment noting how much money was refunded (e.g. including if there was any restocking fees, or goods that weren't returned and remain in the customer's hands); and the like. A return may represent a change to the contract of sale (e.g. the order), and where the e-commerce platform 100 may make the merchant aware of compliance issues with respect to legal obligations (e.g. with respect to taxes). In some embodiments, the e-commerce platform 100 may enable merchants to keep track of changes to the contract of sales over time, such as implemented through a sales model component (e.g. an append-only date-based ledger that records sale-related events that happened to an item).

Dynamic Management of Product Data

E-commerce platforms have significantly advanced the ability of merchants to conduct international online sales. Customers can access information and engage in purchase transactions on an e-commerce platform from different geographical regions, with the expectation that the features of the platform will largely function properly regardless of the specific location of the customer (i.e. the location of the customer's device used to access the e-commerce platform). An e-commerce platform enables international sales and fulfillment of orders originating from multitude of geographical regions. For example, a merchant's online store may be accessible by customer devices in a select number of countries, states, cities, etc. where the merchant desires to conduct their business.

The e-commerce platform may provide merchants with tools to pursue different sales strategies in different geographical regions. For example, various aspects of a merchant's online store, such as user interface design, product offerings, etc., may be customized based on a detected location of a customer's device used to access the online store. In particular, a customer may access a storefront of the merchant that is designed for the customer's current geographical region (which may be defined using geographical identifiers, such as country, state, etc.). Such customization may be performed, for example, in response to specific instructions from a merchant (e.g. user input by the merchant using the e-commerce platform) or automatically based on detecting certain conditions or triggers (which may themselves be defined by the merchant).

When conducting sales in different geographical regions on an e-commerce platform, one of the challenges for the merchant is to determine suitable values of variable product data for the respective geographical regions. Different regions may have region-specific regulatory requirements, customer preferences, etc. which may affect the merchant's choices when deciding on the variable product data for products that are offered by the merchant. As an example, local or state governments may impose regulatory restrictions on pricing, dimensions, quantities, etc. for certain products being sold/offered for sale in their respective jurisdictions. As another example, customer preferences and sensitivity vis-à-vis pricing and/or shipping rates for different categories of products may vary from region-to-region. The customers in a particular geographical region may, for example, have a specific preference in connection with composition of a product's price (e.g. preference for offer price to be inclusive of shipping fees and applicable taxes/duties), while customers in a different geographical region may have a differing preference (i.e. preference for offer price to be listed independently of shipping fees and applicable taxes/duties).

On an e-commerce platform, internationalization of sales may present certain technical challenges. One such challenge is for the platform to dynamically customize variable product data associated with products that are offered for sale, in conformance to any relevant restrictions, localized customer preferences, and/or historical customer behavioral pattern data. As speed and accuracy of information are of utmost importance for retaining customers during online shopping sessions, the platform needs to be able to customize variable product data instantaneously, i.e. in real-time or near real-time, and automatically present the customized data to customers. Variable product data is typically customized based on region-specific parameters, metrics, quantities, etc. (collectively, "dynamic variables"), which may themselves be changed or updated (e.g. real-time shipping rates, tracked locations of available inventory, etc.) by computing systems that are communicably connected to the platform. These dynamic variables may change rapidly and often, with the result that the variable product data may need to be updated in real-time or near real-time so that the platform can be modified to reflect the most up-to-date product data for customers and prospective purchasers.

Variable product data may be provided automatically or in response to queries from customer devices in connection with specific products on the platform. In the latter case, geolocation data for customer devices may affect the values of the dynamic variables, and thus the platform is presented with a further technical challenge of tracking device location data for obtaining variable product data requested by customers. In particular, real-time and/or near real-time values of dynamic variables may be used for generating one or more variable product data items to present to customers.

The proposed solutions disclosed in the present application address the technical challenges associated with managing variable product data on an e-commerce platform. The platform is configured to receive input of values of variable product data for products via merchant devices (i.e. devices that are associated with merchant accounts on the platform). In at least some embodiments, a current inventory location for a product item is tracked, and the current inventory location information is used in obtaining a shipping rate associated with shipping the product to a selected geographical region. More particularly, a shipping rate for shipping the product from a detected current inventory location to a selected geographical region is determined. The platform is further configured to obtain historical transfer value preference data for the geographical region, which is used in generating a transfer value of the product item in real-time. The historical transfer value preference data will be described in greater detail below. The platform generates an indication of the transfer value for the geographical region for display on computing devices, such as merchant devices and/or customer devices.

In at least some embodiments, the e-commerce platform is configured to process requests originating from customer devices to obtain real-time variable product data for selected product items. The platform may first determine a device location associated with a customer device, and associate the device location with a specific geographical region. Once the geographical region for the customer device has been identified, the platform may obtain historical transfer value preference data associated with the geographical region, and determine variable product data that is requested by customer devices based on the historical transfer value preference data. The platform may determine variable product data associated with a product item for a multitude of geographical regions, thus enabling a merchant to manage product data in real-time when conducting international online sales. The platform may also allow customer devices from different geographical regions to instantaneously access variable product data when browsing for or purchasing products on the platform.

In some embodiments, the e-commerce platform allows for automated and controlled user testing to obtain a target set of product data for one or more product items for a geographical region. More particularly, the platform determines a target data set for a geographical region that includes, at least, a target product value and target shipping rate for a product item, and stores an association between the product item and the target product data set for the geographical region in memory. The target data set is obtained based on input received via a multitude of customer devices. Specifically, the platform detects transaction events for a product item based on input received from two or more customer devices in response to different test sets of product data that are provided to those devices. Any two of the test sets of product data that are provided to customers include variants of at least one variable, such as product data or shipping rate. That is, any two test sets of product data will be different in their values for at least one variable that is common to those test sets. The test sets are generated based on historical transfer value preference data for the geographical region. In particular, the values for the variables to be included in the test sets of product data are determined from historical transfer value preference data that is collected for the geographical region. As just one example, the historical transfer value preference data may be used to define ranges of values for the variables that are included in the test sets.

Figure 3:
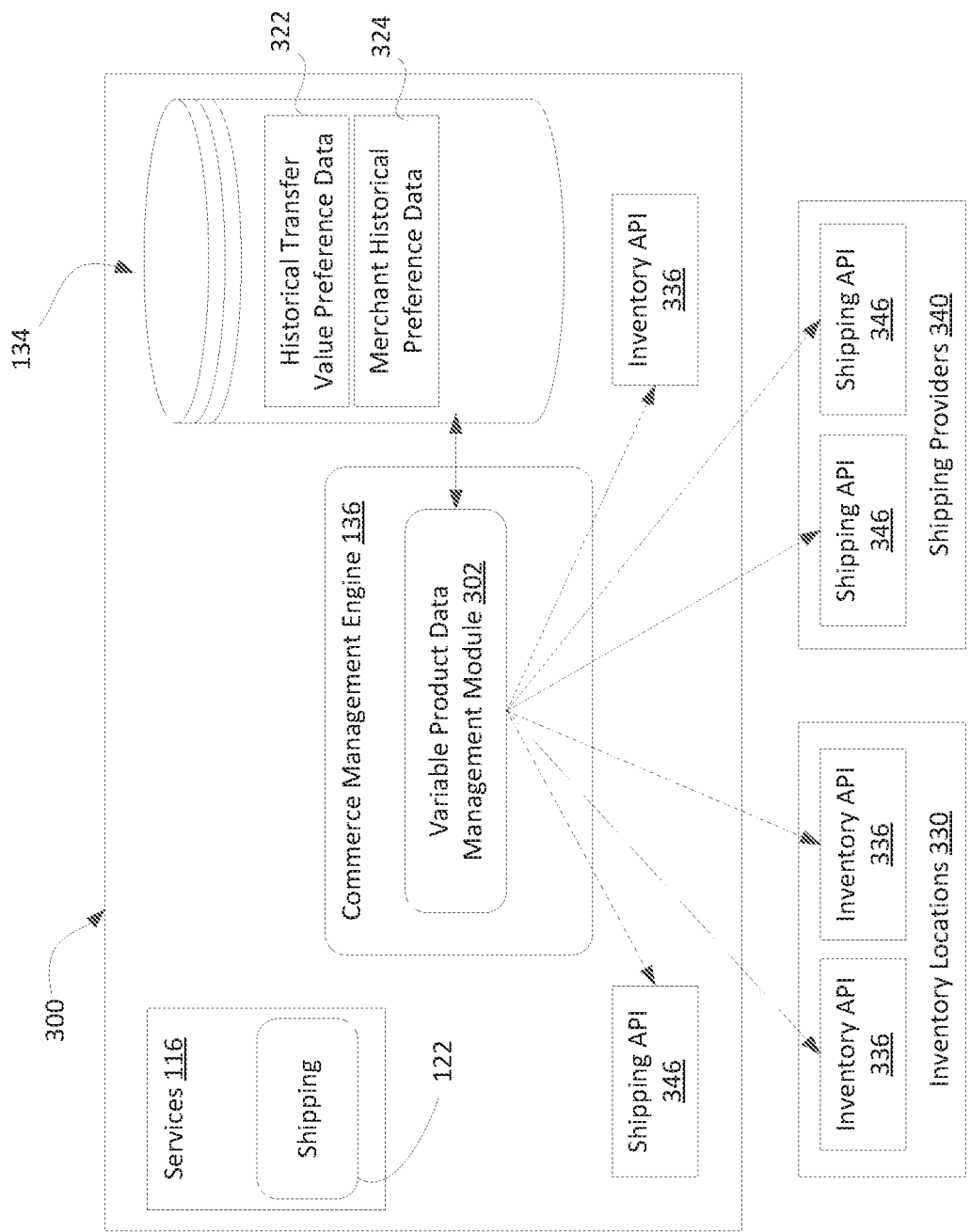
FIG. 3 partially illustrates an example e-commerce platform in block diagram form.

Reference is made to FIG. 3, which illustrates an example e-commerce platform 300 in block diagram form. Not all components of the e-commerce platform 300 are illustrated. The e-commerce platform 300 includes the commerce management engine 136 and its interfaces 140A-B, applications 142A-B, services 116, and the data facility 134. The commerce management engine 136 includes a variable product data management (VPDM) module 302. The VPDM module 302 may be a software-implemented module containing processor-executable instructions that, when executed by one or more processors in the platform 300, cause the platform 300 to carry out some of the processes and functions described herein. Although illustrated as a standalone module within the commerce management engine 136, it will be appreciated that the VPDM module 302, or parts of it, may be implemented within one or more of the applications 142A-B, the shipping services 112, via the shipping provider 122, and/or within other components of the commerce management engine 136.

The VPDM module 302 is configured to manage variable product data associated with products that are offered for sale on platform 300. The VPDM module 302 receives data inputs from merchant devices defining product data for the products that are offered by the merchants. In at least some embodiments, the VPDM module 302 automatically generates values for one or more of the product data variables based on, at least, the data inputs received from the merchant devices. For example, a merchant may input, using their devices, product data for products that are offered in their online store(s). The merchant may indicate which of the product data items are variable (e.g. offer price of product) and which are static (e.g. specification, manufacturer, etc.). The VPDM module 302 may be configured to automatically set and/or update values for those product data items which are indicated to be variable. In particular, the values may be updated by the VPDM module 302 without direct intervention from the merchant that is offering the products.

Further, the VPDM module 302 may cause values of variable product data items to be transmitted to merchant devices and/or customer devices. The commerce management engine 136 may receive requests, from merchant devices, to provide variable product data for products that are offered by the merchants. As a specific example, a merchant may transmit a request, using their device, to the platform 300 to obtain transfer value data for a product. The transfer value data may include, for example, an indication of prices of the product in a multitude of geographical regions where the product is offered for sale. In particular, the merchant can request to obtain, for each of one or more selected geographical regions, suggested pricing data for the product to be employed on the platform 300 for the respective regions. The VPDM module 302 may process such requests from merchants, generating the suggested pricing data for product in the selected geographical regions.

The commerce management engine 136 may also receive requests from customer devices for variable product data associated with products that are offered for sale on the platform 300. For example, a customer or prospective purchaser of a product may request, via a user interface (e.g. product webpage in a merchant's online store) associated with the platform 300, to obtain product data. The VPDM module 302 may generate variable product data (e.g. offer price) for the product and provide the data to the customer via the customer's device. As a particular example, when a customer visits a product website for a certain product, the commerce management engine 136 may detect, in real-time, a current device location associated with the customer device. The VPDM module 302 may identify a geographical region corresponding to the current device location, and determine the variable product data for the product based on the identified geographical region. The variable product data may be determined in accordance with one or more of the techniques described throughout the present disclosure.

The VPDM module 302 is communicably connected to a data facility 134. In the example of FIG. 3, the data facility 134 is shown as being integral to the e-commerce platform 300 but may be external to it in other implementations. The data facility 134 may include one or more data storage units. In some cases, the data storage may be in database format and may include one or more databases. The databases may be relational databases, in some examples. The data facility 134 is illustrated as a single unit for ease of illustration, but may include a plurality of storage units and, in some cases, storage media connected via network and external to the platform 300. The VPDM module 302 is configured to access one or more of the storage units of data facility 134. For example, the VPDM module 302 may formulate database queries for retrieving data from the historical transfer value preference data storage 322, the merchant historical preference data storage 324, and/or the delivery profiles database 326.

The data facility 134 may store data collected by the e-commerce platform 300 based on the interaction of merchants and customers with the platform 300. For example, merchants provide data through their online sales activity. Examples of merchant data for a merchant include, without limitation, merchant identifying information, product data for products offered for sale, online store settings, geographical regions of sales activity, historical sales data, and inventory locations. Customer data, or data which is based on the interaction of customers and prospective purchasers with the platform 300, may also be collected and stored in the data facility 134. Such customer data is obtained on the basis of inputs received via customer devices associated with the customers/prospective purchasers. By way of example, historical transaction event data including details of purchase transaction events by customers on the platform 300 may be recorded and such transaction event data may be considered customer data. Such transaction event data may indicate product identifiers, date/time of purchase, final sale price, purchaser information (including geographical region of customer), and payment method details, among others. Other data vis-à-vis the use of platform 300 by merchants and customers (or prospective purchasers) may be collected and stored in the data facility 134.

The historical transfer value preference (HTVP) data 322 represents data indicating the historical preference of customers and/or prospective purchasers with respect to the transfer value of products. The HTVP data 322 may be obtained by collecting data based on the interactions of customers with the platform 300. In particular, the HTVP data 322 may be included in customer data that is collected and stored by the platform 300. For example, the HTVP data 322 may include transaction event data associated with customers who have purchased products on the platform 300. In some cases, the HTVP data 322 is a representation of customer input data, received at the platform 300 via one or more customer devices, defining transfer value preference of the customers. The HTVP data 322 may be obtained by tracking one or more predefined variables in the data inputted via customer devices to the platform 300. Alternatively, the HTVP data 322 may, in some embodiments, include data that is derived from sources other than the interactions of customers with the platform 300. For example, the HTVP data 322 may include hard-coded definitions indicating specific preferences of customers in one or more geographical regions with respect to transfer values.

The HTVP data 322 may be categorized by geographical region. In particular, the HTVP data 322 defines, for each of one or more geographical regions, the preference of customers and/or prospective purchasers from that region. For example, the data input from customer devices that are associated with a geographical region may be grouped together. Certain variables of such region-specific customer data which identify preferences of the customers may be tracked in order to generate the HTVP data 322. Such tracked variables, which may have discrete or continuous values, include, but are not limited to: inclusion of taxes in sale price; amount of cross-border duties; shipping cost tolerance; product category pricing comparable; sale price compositions; and optimal shipping rate for proximal geographical regions. The input data from customer devices may directly indicate values for the tracked variables (e.g. survey responses, input prompts, etc.) or may indirectly provide such values (e.g. on the basis of browsing and purchase transaction events conducted on the user devices). The HTVP data 322 may represent the tracked variables for each of one or more geographical regions (which may be predefined or selected by merchants). The commerce management engine 136, or components thereof, may query the HTVP data 322 to retrieve values of one or more of the tracked variables by geographical region.

The HTVP data 322 may also be categorized by time period. For example, a query to retrieve HTVP data 322 may identify start and end times of a time period for which customer preference data is desired to be obtained. Such a query may produce a result data set that contains values for tracked variables during the specified time period.

The values for each of the tracked variables may be expressed in discrete terms (e.g. binary, such as preferred by customer vs. not preferred by customer) or in continuous terms. For example, the HTVP data 322 may indicate a range of acceptable or preferred amounts for some variables, such as shipping cost tolerance and amount of cross-border duties. In particular, those variables which indicate tolerance levels of customers may be expressed in terms of a range identifying a lower and an upper limit of acceptable values. The preference data may, in some cases, be expressed as percentages (e.g. a percentage of final sale price, etc.).

The merchant historical preference data 324 represents data indicating the historical preference of merchants with respect to their practice for determining transfer values for their products. Merchants that have conducted business in a multitude of different geographical regions may have developed their own practice in regard to setting the transfer values for their products. For example, a merchant may have existing rules and preferences in place for one or more geographical regions in terms of variables such as sale price compositions, inclusion of taxes in sale price, etc. Such merchant-specific data may be retrieved by querying the merchant historical preference data 324 for data pertaining to a particular merchant.

In at least some embodiments, the merchant-specific rules and preferences identified in the merchant historical preference data 324 may be combined with HTVP data 322 associated with customer preferences when setting the transfer values for one or more products on the platform 300. In particular, the HTVP data 322 and the merchant historical preference data 324 of a specific merchant for a geographical region may be accessed in determining a transfer value of the merchant's product(s) for the region. For example, the commerce management engine 136 (or a component thereof, such as the VPDM module 302) may query both the HTVP data 322 of a geographical region and a merchant's historical preference data 324 for automatically setting the transfer value of the merchant's products that are offered for sale on the platform 300. More generally, variable product data for one or more of a merchant's products may be determined based on both the merchant's historical preference data 324 and HTVP data 322 associated with selected geographical regions.

An inventory location 330 is typically, but not limited to, a vendor, seller, or source that may have or may make available or may manufacture inventory of a product. An inventory location 330 may be an actual brick-and-mortar location (e.g. a retail store or warehouse), may be operated or controlled by a merchant or, alternatively, a third party to a merchant such as a third party logistics or product provider, or may be a logical source from which the product can be obtained (e.g. another online source) with the capability of the product being shipped to a destination. In some embodiments, an inventory location 330 may be capable of making or manufacturing a product, optionally with product components and labor on site, or alternatively also have an internal or external source for a product (e.g. outsourcing, drop shipment, and the like) and the inventory assessment for such location may consider the products that can be made or manufactured (such as by considering available components, parts and labor) and not only the products present at the location.

In some embodiments, inventory information may include, without limitation, availability, quantity, and condition (e.g. new, refurbished, used, and the like) of product(s) at one or more inventory locations 330. Inventory information may be obtained internal or external to an e-commerce platform 100, and may be acquired by database lookups, API calls, or other computing operations. Inventory information may consider products which may be created, manufactured, or otherwise sourced for prospective or completed transactions, either in real-time or under just-in-time practices or other timeframes, for a particular application or product.

A shipping provider 340 may be a shipping carrier (e.g. UPS, FedEx, shipping capabilities of the platform 100, or the like) that provides shipping services, but it may also be any party capable of transporting, delivering, or rendering a product to a designated destination.

In some embodiments, shipping information may include, without limitation, available shipping providers 340, shipping services available (e.g. one-day, two-day, air, ground, and the like). It may also include weight, dimensions, dimensional weight, oversize considerations, handling times, shipping times, shipping costs/rates, restrictions, handling instructions, insurance, proof of delivery/acceptance considerations, customs considerations, Harmonized Commodity Description and Coding System or HTS considerations, tax considerations, origin and destination considerations, and other information related to fulfillment, transport, rendering, or delivery of a product to a destination. Shipping information may also include information on download (such as for a digital or electronic product), freight, pickup, installation, or custom or other arrangements for fulfillment or delivery of a product. Shipping information may be obtained internal or external to an e-commerce platform 100, and may be acquired by database lookups, API calls, or other computing operations.

An API refers to an application programming interface under the conventional definition known in the art, or any software, platform, or communication means that may allow two computing devices or systems to exchange information, such as inventory or shipping information. For example, a shipping provider 340 may have an API to allow its customers and other parties to retrieve shipping rates and other information relating to its product and service offerings. An e-commerce platform 300 therefore may request information from the shipping provider 340 for a given prospective shipment via the shipping provider's 340 API, and such a request from the e-commerce platform 300 to the shipping provider 340 may be an API call. In such an example, when the shipping provider 340 responds to the e-commerce platform 300 API call that was made, the reply may be an API response. Similarly, inventory locations 330 may have an API for providing inventory information, such as availability and condition of products.

Figure 4:
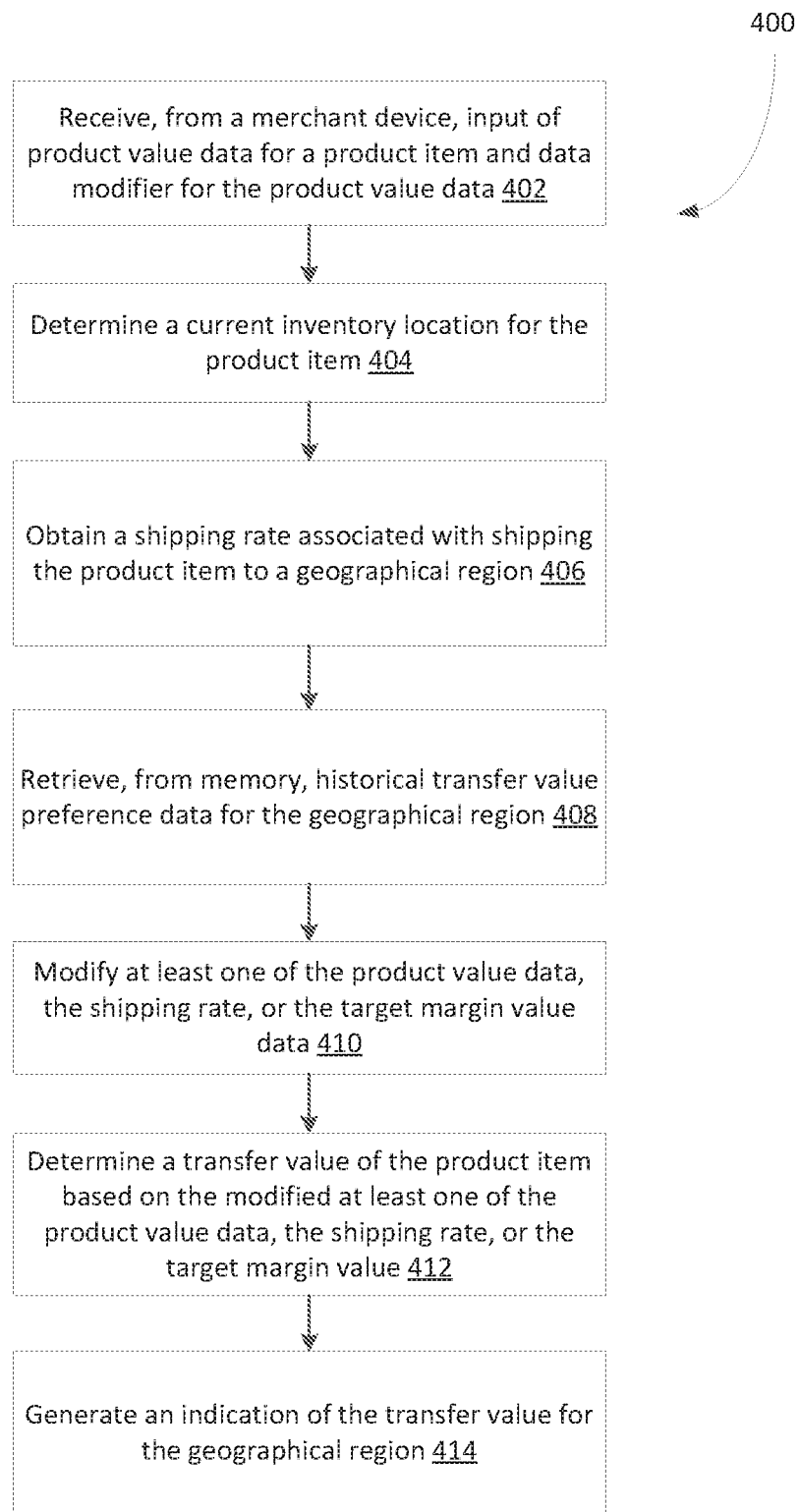
FIG. 4 shows, in flowchart form, an example method for generating transfer value data for a product item.

Reference is now made to FIG. 4, which shows, in flowchart form, an example method 400 for generating transfer values for a product item. The method 400 may be implemented by an e-commerce platform, such as e-commerce platform 300 (FIG. 3). In at least some embodiments, the method 400 may be at least partially implemented by one or more components of a commerce management engine of the platform, such as the VPDM module 302 of FIG. 3. The platform may perform the operations of method 400 when generating transfer values of a product for one or more geographical regions where the product may be offered for sale on the platform.

In operation 402, the platform receives input of product value data for a product item and a data modifier for the product value data. A merchant may input, via a device associated with their merchant account on the platform, the product value data for a product that the merchant offers for sale and at least one data modifier for the product value data. The data modifier identifies a target margin value associated with the product item. In some embodiments, the product value data may represent a product cost of a unit of the product that is defined by the merchant, and the target margin may be a desired margin amount on sale of the product unit. For example, the merchant's input may express the product value data as a monetary amount, and the target margin as a fixed value (e.g. monetary amount, percentage of product cost, etc.).

The input of product value data and the data modifier may be received as part of a request to obtain transfer values for the product item from the e-commerce platform. In particular, a merchant may request, using their device, to receive transfer values for a product item which may be employed in the merchant's online store(s) on the platform in one or more selected geographical regions. The request for transfer values may indicate a selection of at least one geographical region, in addition to the product value data and the data modifier.

In operation 404, the platform determines at least one current inventory location for the product item. The inventory location is determined based on tracking data associated with inventory of the product item. In at least some embodiments, the platform may maintain tracking data indicating available stock and current location of inventory of a product item. The platform may, for example, query one or more inventory locations for the product item, via calls to the inventory APIs associated with said inventory locations, and obtain inventory data in real-time based on the query results.

In operation 406, the platform obtains a shipping rate associated with shipping the product item to a selected geographical region from the at least one current inventory location. The shipping rate may be obtained, in real-time, from one or more shipping providers that are capable of shipping the product item to the selected geographical region. The platform may query one or more shipping providers to determine whether shipping services to the selected geographical region are available by the providers, and if available, the platform may request to retrieve shipping rates from said providers. The shipping rate data may be retrieved, for example, via calls to the shipping APIs associated with those shipping providers. The API calls may include, at least, a current inventory location of the product item and a selection of a geographical region. The shipping rate may be expressed as a single value or as a range of values. That is, the shipping rate data obtained from the shipping providers may indicate a single rate/cost or a cost range. For example, a shipping rate may be a cost of shipping the product item from a current inventory location to a fixed destination in the selected geographical region (e.g. a default address). Alternatively, a range of costs may be indicated by the shipping rate, identifying, for example, a lower and upper limit on the costs of shipping the product item to the selected geographical region (i.e. corresponding to different locations within the geographical region).

In operation 408, the platform retrieves, from memory, historical transfer value preference data for the selected geographical region. The historical transfer value preference data may, for example, include or be the same as HTVP data 322 described above with reference to FIG. 3. In particular, the historical transfer value preference data is data which represents the preference of customers in a geographical region vis-à-vis the transfer value of products. The historical transfer value preference data includes data indicating, for each of one or more geographical regions, customer preference data for that region. The historical transfer value preference data may be obtained from a memory associated with the platform, or from a data storage (e.g. database) that is accessible from the platform.

In operation 410, the platform modifies at least one of the product value data, the shipping rate, or the target margin value data based on the historical transfer value preference data that is retrieved in operation 408. The platform determines, at least based on the information included in the historical transfer value preference data, whether one or more of the product value data, the shipping rate, or the target margin value should be adjusted in deriving the transfer value of the product item for the selected geographical region. The adjusted value(s) may then be used in determining a transfer value for the product item in the geographical region.

The historical transfer value preference data may, for example, indicate that customers of the geographical region have a preference toward a lower product value and a higher shipping rate, as opposed to a higher product value and a lower shipping rate, given the same transfer value for a product. For example, customers may consider a lower product value of a product item favorably, even if it is accompanied by a higher shipping rate, on the assumption that the product value is within the control of the merchant while the shipping rate is not. Based on the historical transfer value preference data, the platform may determine adjustments to one or both of the product value (i.e. initial product value defined by the merchant) and the shipping rate associated the product item (obtained in operation 406). For example, the platform may determine an amount of increase in the product value and an amount of decrease in the shipping rate for the product item. The adjustments in value may be guided, at least, by the historical transfer value preference data for the geographical region. As a particular example, the historical transfer value preference data may indicate a tolerance range for the shipping rate for the product item. The tolerance range may identify an upper limit and a lower limit (e.g. in percentages, actual amounts, etc.) for the shipping rate which may be acceptable for the customers of the geographical region. Any adjustments in value of the shipping rate may limit the adjusted values to be within the tolerance range specified in the historical transfer value preference data.

In at least some embodiments, the platform may determine adjustments to the product value for the product item to comply with the target margin value. For example, if the shipping rate is adjusted to be lower (on the basis of the historical transfer value preference data) in operation 410, the product value may need to be adjusted upwards to maintain the merchant's desired target margin value for sale of each unit of the product item. An amount of adjustment of the product value may be determined based on an adjustment (if any) of the shipping rate and the target margin value set by the merchant.

In operation 412, the platform determines a transfer value of the product item based on the modified at least one of the product value data, the shipping rate, or the target margin value. That is, the adjusted (or unadjusted, if not modified in operation 410) values of the product value data, the shipping rate, and the target margin value are used by the platform in generating a transfer value of the product item for the selected geographical region.

In operation 414, the platform generates an indication of the transfer value of the product item for the geographical region for display on a computing device. In particular, the transfer value of the product item may be communicated to the merchant device. For example, the transfer value may be presented as data output in response to a request or query from the merchant device to obtain transfer values of the product item for one or more selected geographical regions.

It should be noted that the method 400 of FIG. 4 is applicable for obtaining transfer values of a product item for a multitude of geographical regions. That is, while the above explanation describes the operations associated with obtaining a transfer value corresponding to a single selected geographical region, the method 400 may be generalized to obtain transfer values of a product item for multiple regions. The platform may generate, for each of the regions, a respective transfer value of the product item, and communicate the transfer values to the requesting merchant.

Figure 5:
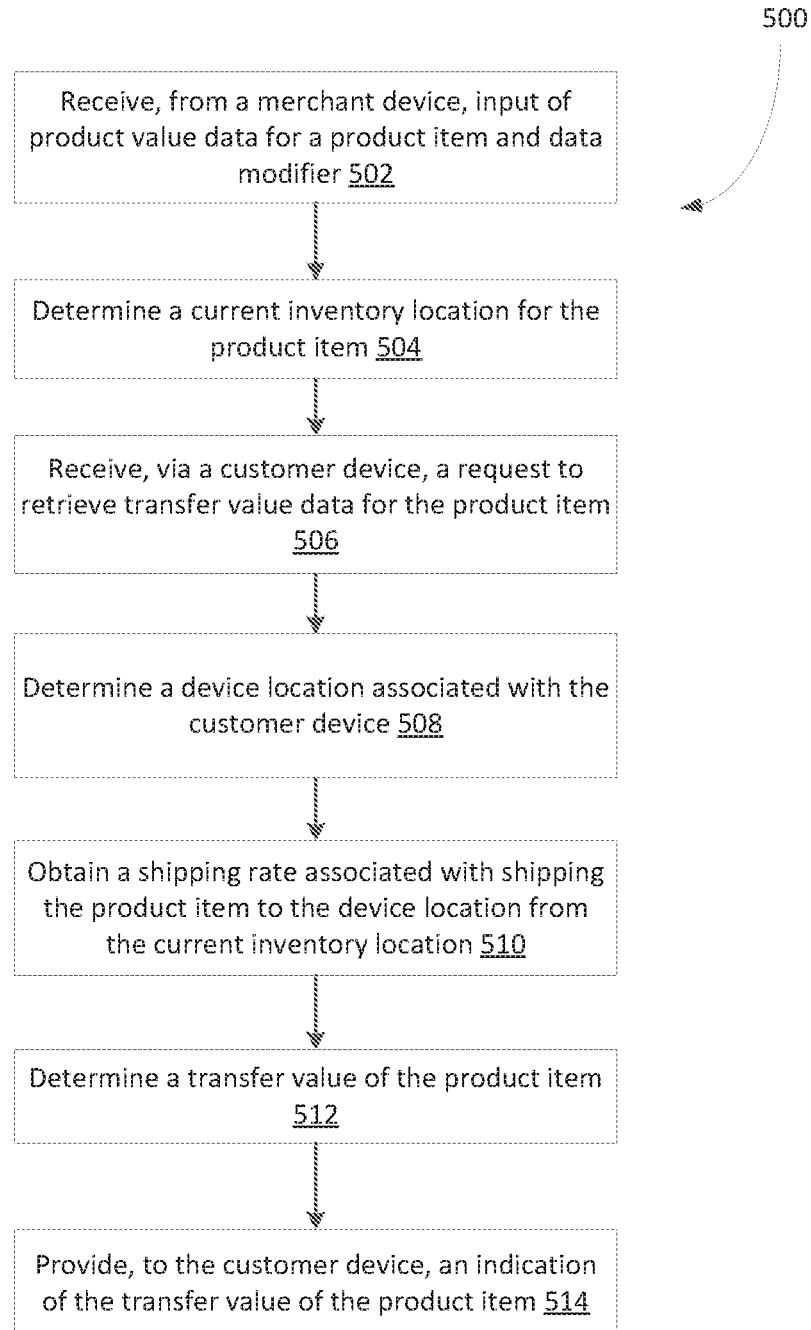
FIG. 5 shows, in flowchart form, another example method for generating transfer value data for a product item.

Reference is now made to FIG. 5, which shows, in flowchart form, an example method 500 for generating transfer values for a product item. The method 500 may be implemented by an e-commerce platform, such as e-commerce platform 300 (FIG. 3). In at least some embodiments, the method 500 may be at least partially implemented by one or more components of a commerce management engine of the platform, such as the VPDM module 302 of FIG. 3. The platform may perform the operations of method 500 when generating transfer values of a product for one or more geographical regions where the product may be offered for sale on the platform. It will be understood that the platform may be configured to perform the operations of method 500 in addition to and/or in combination with one or more of the operations of method 400 of FIG. 4 in generating transfer values for product items that are offered via the platform.

In operation 502, the platform receives, from a merchant device, input of product value data for a product item and a data modifier associated with the product value data. The data modifier identifies a target margin value associated with the product item. In operation 504, the platform determines a current inventory location for the product item. Operations 502 and 504 correspond to, and may be performed in a similar manner as, operations 402 and 404 of method 400.

In operation 506, the platform receives, via a customer device, a request to retrieve transfer value data for the product item. In at least some embodiments, the request may be part of a more general request to obtain product data for a selected product item. For example, when a customer visits a product website for a product item using their device, a browser application on the customer device may generate an HTTP request to retrieve page data for the product website (i.e. HTML document). The product website may, for example, be a webpage that is accessible via one of the merchant's online stores. A request for product data (e.g. transfer value of product) associated with the product item corresponding to the requested website may be transmitted to the platform.

Upon receiving the request, the platform determines, in operation 508, a current device location associated with the customer device. The current device location may be determined, for example, based on an IP address associated with an originating device of the HTTP request. In some embodiments, the customer may have an existing account with the merchant's online store or be signed in, as a user, on the platform. The current device location of the customer device may then be determined based on user account data associated with the customer, such as registration information, sign-in location, etc., which may be accessed by the platform.

In operation 510, the platform obtains a shipping rate (or cost of shipping) for shipping the product item from the current inventory location to a device location associated with the customer device. The device location may, for example, be specified using geographical identifiers (e.g. country, state/province, city, etc.). The platform may make API calls to one or more shipping providers to determine shipping rates for the product item. The API calls may indicate, at least, the device location of the customer device (as shipping destination) and one or more current inventory locations for the product item.

In operation 512, the platform determines a transfer value of the product item. The transfer value may be determined based, at least in part, on the product value data, the shipping rate for shipping the product item to the current device location (or a geographical region associated therewith), and the target margin value. The transfer value of the product item may be determined in a similar manner as in method 400. In particular, the product value data, the shipping rate, and/or the target margin value may be adjusted on the basis of the historical transfer value preference data associated with the customer device's geographical region, and the transfer value determined based on the adjusted (or unadjusted) values.

In operation 514, the platform provides, to the customer device, an indication of the transfer value of the product item. For example, the transfer value may be presented on an HTML document for the product website that is requested by the customer device.

Figure 6:
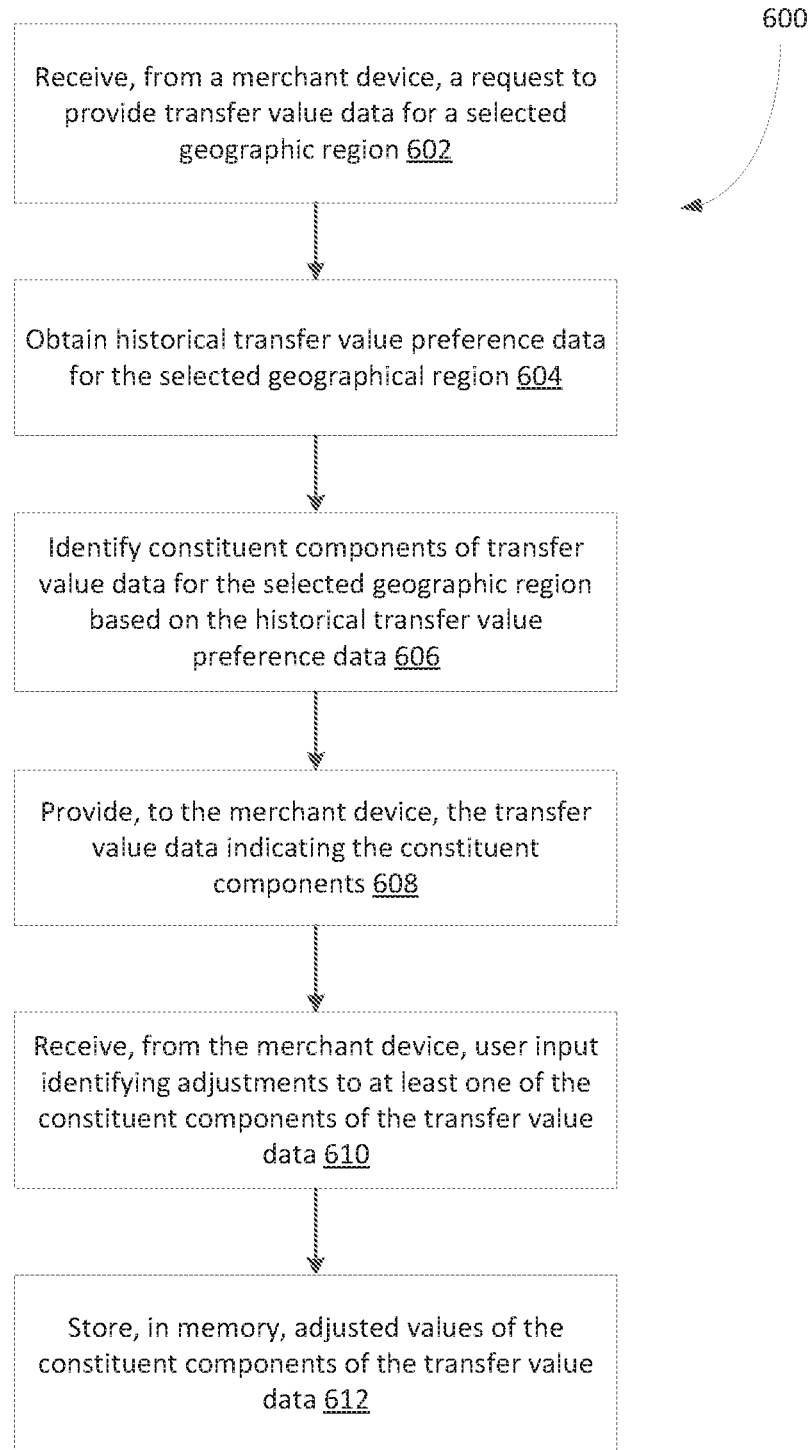
FIG. 6 shows, in flowchart form, an example method for adjusting transfer value data for a product item.

Reference is now made to FIG. 6, which shows, in flowchart form, an example method 600 for adjusting transfer value data for a product item. The method 600 may be implemented by an e-commerce platform, such as e-commerce platform 300 (FIG. 3). In at least some embodiments, the method 600 may be at least partially implemented by one or more components of a commerce management engine of the platform, such as the VPDM module 302 of FIG. 3. The platform may perform the operations of method 600 when adjusting the transfer value of a product for one or more geographical regions where the product may be offered for sale on the platform. It will be understood that the platform may be configured to perform the operations of method 600 in addition to and/or in combination with one or more of the operations of method 400 of FIG. 4 and method 500 of FIG. 5 in processing transfer values for product items that are offered via the platform.

In operation 602, the platform receives, from a merchant device associated with a merchant account, a request to provide transfer value data for a selected geographic location. For example, a merchant may desire to obtain a transfer value (e.g. final sale price) for a product to be employed when offering the product for sale on the platform. The platform may be configured to determine such transfer value data for the product and present the data to the requesting merchant.

In operation 604, the platform obtains historical transfer value preference data for the selected geographical region. The historical transfer value preference data may be retrieved from a memory associated with the platform, and/or retrieved from an external data storage that is accessible by the platform. In operation 606, the platform identifies constituent components of transfer value data for the selected geographical region based on the historical transfer value preference data. In particular, the historical transfer value preference data may indicate a preference of customers in a geographical region with respect to the composition of final sales price of products. For example, the customers in a particular region may have a preference toward including taxes as part of the sales price such that the tax associated with sale of a product is not independently presented to the customers. Similarly, customers may prefer to have the shipping cost integrated into the final sales price, rather than as an independent component of the final sales price. In such cases, the platform may only identify the final sales price, and possibly any applicable cross-border duties, for the transfer value data. In other embodiments, different compositions for the final sales price may be presented to the merchant (e.g. final sales price incorporates shipping cost but not taxes, transfer value data identifies product value, shipping cost, and applicable taxes and duties separately, etc.).

In operation 608, the platform provides, to the merchant device, the transfer value data indicating the constituent components. That is, the transfer value for the product is represented according to the composition that is identified from the historical transfer value data. In operation 610, the platform receives, from the merchant device, user input identifying adjustments to at least one of the constituent components of the transfer value data. For example, the merchant may input, using their device, desired adjustments to constituent components, such as product value, shipping rate, taxes, or duties, of the product's transfer value.

In operation 612, the platform stores, in a memory associated with the platform, adjusted values of the constituent components of the transfer value data. The adjusted values are based on input received from merchant devices requesting for adjustments to one or more constituent components of the transfer value for a product which were automatically determined by the platform. The adjusted values thus represent the merchant's desired changes to transfer value data produced by the platform.

Figure 7:
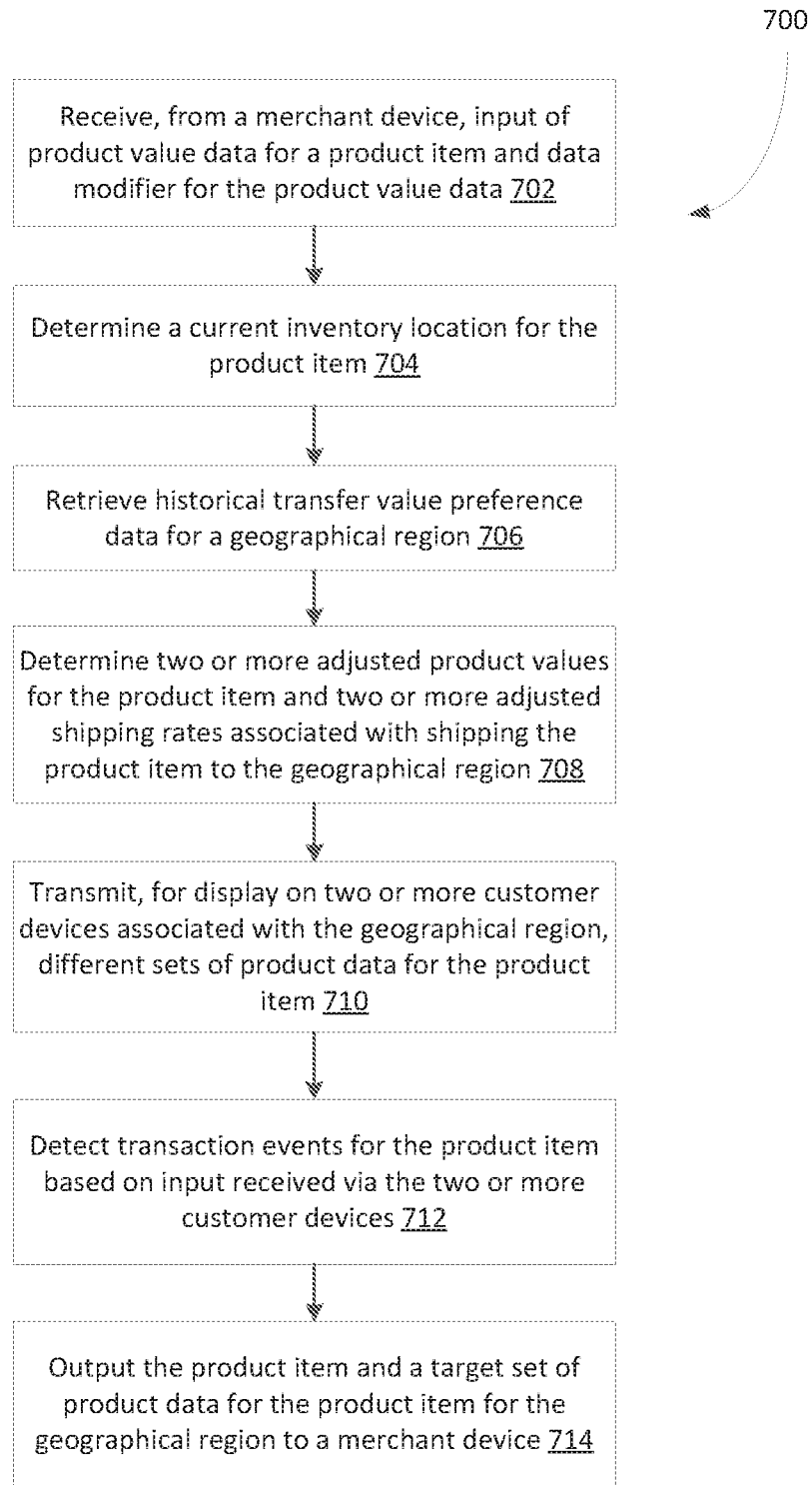
FIG. 7 shows, in flowchart form, an example method for performing controlled testing of product value data for a product item.

Reference is now made to FIG. 7, which shows, in flowchart form, an example method 700 for performing controlled testing of product value data for a product item. The method 700 may be implemented by an e-commerce platform, such as e-commerce platform 300 (FIG. 3). In at least some embodiments, the method 700 may be at least partially implemented by one or more components of a commerce management engine of the platform, such as the VPDM module 302 of FIG. 3. The platform may perform the operations of method 700 in a process for determining recommendations for transfer values of a product item in one or more geographical regions where the product may be offered for sale on the platform.

In accordance with embodiments of method 700, the present disclosure provides techniques for conducting user preference testing to determine optimal transfer values for products that are offered for sale on an e-commerce platform. More particularly, based on a process of controlled testing, the platform derives optimizations of transfer values of a product for one or more geographical regions where the product is or may be sold.

In operation 702, the platform receives, from a merchant device associated with a merchant account, input of product value data for a product item and a data modifier for the product value data. The data modifier identifies, at least, a target margin value associated with the product item. The platform may additionally receive a selection of a geographical region (i.e. region for which transfer value optimality is sought by the merchant). In operation 704, the platform determines at least one current inventory location for the product item based on tracking data associated with inventory of the product item. For example, the platform may make API calls to inventory APIs associated with one or more inventory locations for the product. In operation 706, the platform retrieves historical transfer value preference data for a selected geographical region. As described above, the historical transfer value preference data represents data collected across customers or prospective purchasers in the selected geographical region with regard to transfer values for products on the platform. In particular, the historical transfer value preference data indicates localized preference data for, at least, product value and shipping rates for one or more product items that are available on the platform. The operations 702, 704 and 706 of method 700 correspond to, and may be performed in a similar manner as, operations 402, 404 and 406 of method 400.

In operation 708, the platform determines two or more adjusted product values for the product item and two or more adjusted shipping rates associated with shipping the product item to the geographical region. The adjusted product values and the adjusted shipping rates are determined based, at least in part, on the historical transfer value preference data. As a particular example, the historical transfer value preference data may indicate that customers of the selected region have a preference toward lower product value and higher shipping costs, as opposed to higher product value and lower shipping costs, for a product having the same transfer value. The platform may thus identify two values that are lower than the merchant-defined product value as the "adjusted" product values, in operation 708. The shipping rates are determined based on a current inventory location for the product item. In this example, the "adjusted" shipping rates may be two shipping rate values that are higher than the shipping rate obtained by the platform from shipping providers. That is, the adjusted product values are selected to be lower than the merchant's product value, and the adjusted shipping rates are selected to be higher than the initial shipping rate for shipping the product item to the geographical region. The selections of the adjusted product values and the adjusted shipping rates may define a range of product values and a range of shipping rates, respectively. As explained above, the ranges of product values and shipping rates may be determined, in part, based on the historical transfer value preference data. In some embodiments, the choice of the adjusted product values and the adjusted shipping rates may depend on the target margin value for the product item. In particular, the adjusted product values may be selected such that margin amounts for transfer values which incorporate said adjusted product values are greater than or equal to the target margin value.

In operation 710, the platform transmits, for display on two or more customer devices ("test customer devices") associated with the geographical region, different sets of product data for the product item. Each of the product data sets includes a different combination of the adjusted product values and adjusted shipping rates obtained in operation 708. These product data sets represent test data with which user preference in relation to transfer values of the product item will be gauged. In particular, the platform determines, through controlled user testing, customer preferred values for, at least, a product value for the product item and a shipping rate associated with shipping the product item to the geographical region.

By way of example, the platform may transmit two different data sets, set A and set B, of product data for a product item to two different test customer devices, device 1 and device 2. Each of the sets A and B contains product data for the product item including, at least, a product value and an associated shipping rate. The sets A and B are selected such that they contain different values for at least one data variable. For example, the platform may select sets A and B such that the sets contain the same data for all but one variable (e.g. product value, shipping rate, etc.). That is, values of all variables are held constant as between sets A and B with the exception of one variable, or test variable, for which set A contains a first value ("variant A") and set B contains a second different value ("variant B"). Selecting the data sets in this manner and employing them in user preference testing enables comparing the effects of the different values of the test variable.

In at least some embodiments, the different product data sets may be provided in a same interface on the two or more different test customer devices. For example, different sets of product data may be displayed on a product website for the product item (or another user interface for the merchant's online store) when accessed by two or more different test customer devices. That is, different versions of the product website may be displayed on test customer devices that are identified as different devices (e.g. devices associated with different IP addresses, user sign-in information, etc.). The platform may track the information that is displayed on the product website on the devices associated with customers that are subjected to the user preference testing process, to ensure controlled testing of the product data. In particular, the platform may record information about the selected test customer devices and the product data that is provided to the respective devices. For example, test customer device information may be stored in association with a respective product data set in a database maintained and/or accessible by the platform.

In operation 712, the platform detects transaction events for the product item based on input received via the two or more test customer devices. That is, the platform may monitor for and detect transaction events which are initiated via input from the test customer devices in response to the different sets of product data that are provided to the test customer devices. In particular, the platform may detect transaction events for the product item associated with at least one of the different test data sets. As an example, the platform may detect online purchase activity engaged in by using the test customer devices. Specifically, the platform detects when the product item is selected or purchased using one of the test customer devices, for example, on the product website (and more generally, in the merchant's online store) for the product item. A transaction event may be detected when the product item is added to a virtual shopping cart, a purchase of the product item is made (e.g. payment by customer), an order for the product item is fulfilled, etc.

In operation 714, the platform outputs the product item and a target set of product data for the product item for the geographical region to a merchant device for display. The target set of product data is selected based on the detected transaction events. In particular, the target set may contain product data that corresponds to the data set(s) provided to those test customer devices from which transaction events for the product item were detected. For example, if a transaction event is detected from only one of the test customer devices, the target set may contain only the product data which was presented to that one test customer device. If two or more transaction events are detected from multiple test customer devices, the target set may contain ranges of values for variables, the ranges including and/or defined by those product data values provided to the multiple test customer devices.

It will be noted that such controlled testing of user preference data may be performed across a plurality of customer devices and multiple different combinations of product values and shipping rates. In this way, the target set may be revised and refined through continuous assessment of transaction events responsive to different test data sets.

In some embodiments, the platform may request the merchant to assess and confirm the target set of product data. In particular, the platform may request such confirmation when outputting the product item and the target set of product data for the geographical region to the merchant device. The platform may transmit, to the merchant device, a request for confirmation that, for the geographical region, the product item is to be associated with the target set of product data. The request may, for example, be included in a visual prompt that is displayed on the merchant device. The platform may associate the product item with the target product data set only if the platform receives, via the merchant device, input confirming the proposed association.

In at least some embodiments, the platform may store, in memory, an association between the product item and a target set of product data for the product item for the geographical region. More particularly, responsive to receiving input confirming that, for the geographical region, the product item is to be associated with the target set of product data, the platform may store the product item in association with the target set of product data for the geographical region.

In at least some embodiments, the target set of product data, or a subset thereof, may be communicated to the merchant as a recommendation. More specifically, the platform may determine, for the selected geographical region, recommended transfer value data indicating at least a recommended adjusted product value for the product item and a recommended shipping rate for the product item. The recommended values may, for example, be those values that are included in the target product data set or values that are derived based on ranges defined by the target product data set (e.g. average, median, etc. of values or range of values). The recommended transfer value data may then be transmitted to the merchant device. In some embodiments, the recommended transfer value data may indicate tax and duties information associated with the product item. For example, the recommendation may indicate one or more recommended transfer values and recommended price composition including values for product value, shipping rate, tax, and duties.

Figure 8:
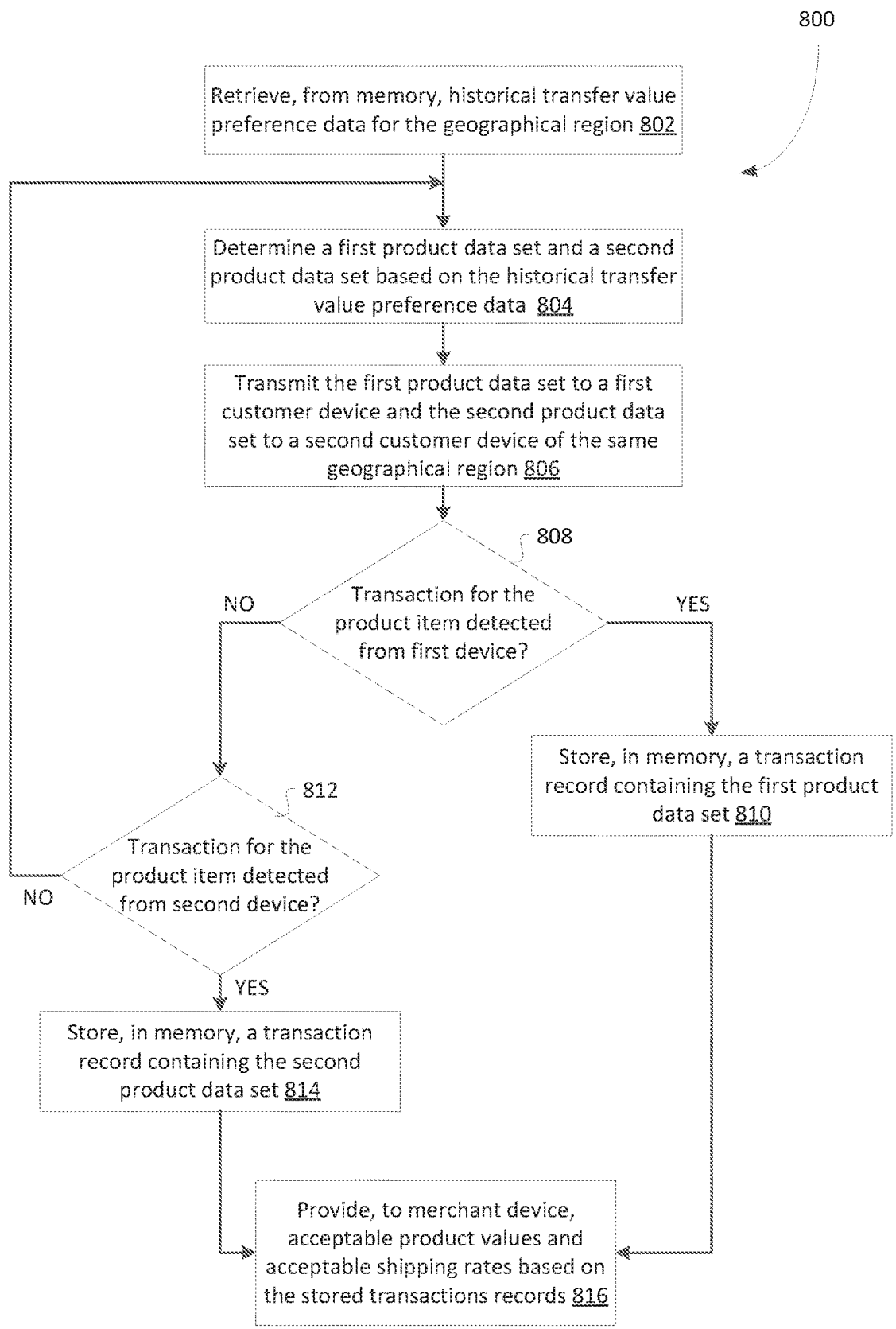
FIG. 8 shows, in flowchart form, another example method for performing controlled testing of product value data for a product item.

Reference is now made to FIG. 8, which shows, in flowchart form, an example method 800 for performing controlled testing of product value data for a product item. The method 800 may be implemented by an e-commerce platform, such as e-commerce platform 300 (FIG. 3). In at least some embodiments, the method 800 may be at least partially implemented by one or more components of a commerce management engine of the platform, such as the VPDM module 302 of FIG. 3. The platform may perform the operations of method 800 in a process for determining recommendations for transfer values of a product item in one or more geographical regions where the product may be offered for sale on the platform. It will be understood that the platform may be configured to perform the operations of method 800 in addition to and/or in combination with one or more of the operations of method 700 of FIG. 7 in performing controlled testing of product value data for product items that are offered via the platform.

In operation 802, the platform retrieves, from memory, historical transfer value preference data for a selected geographical region. In operation 804, the platform determines a first product data set and a second product data set based on the historical transfer value preference data, and the first and second product data sets are transmitted to a first customer device and a second customer device of the same geographical region, respectively, in operation 806. The first and second product data sets may be determined in a similar manner as the test data sets of operation 710 of method 700. In particular, the first and second product data sets contain, at least, respective values of product value and shipping rate (i.e. shipping cost associated with shipping the product item from a current inventory location to the geographical region) and the data sets differ in the values for at least one of the variables.

In operation 808, the platform determines whether a transaction event for the product item is detected based on input from the first customer device. The detection of transaction events may be performed in a similar manner as in operation 712 of method 700. If a transaction event is detected via input from the first customer device, the platform stores, in memory, a transaction record for the product item containing the first product data set, in operation 810. For example, a transaction record may be stored in association with the product value and shipping rate indicated in the first product data set.

On the other hand, if no transaction event is detected via input from the first device and a transaction event for the product item is detected via input from the second device, the platform stores, in memory, a transaction record containing the second product data set, in operation 814. For example, a transaction record may be stored in association with the product value and shipping rate indicated in the second product data set.

Upon detecting transaction events for the product item from one or both of the first device, the method 800 proceeds to operation 816, in which the platform provides, to the merchant device, target product data set indicating, at least, acceptable product values and acceptable shipping rates based on the stored transaction records.

If no transaction event is detected from either the first device or the second device, the method returns to operation 804 where different product data sets are determined for continuing with controlled testing of user preference data.

Figure 9:
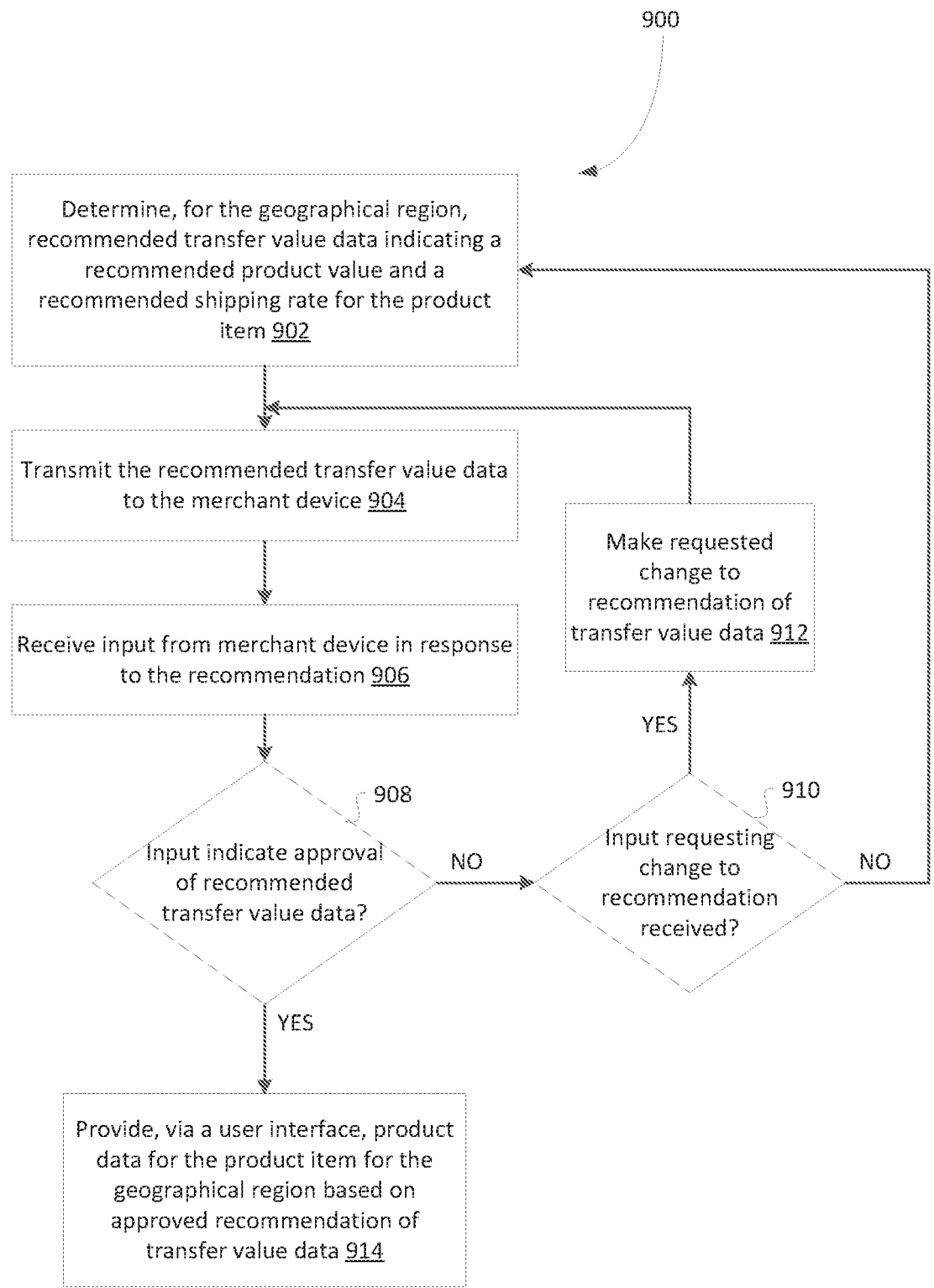
FIG. 9 shows, in flowchart form, an example method for providing product data to a merchant via an e-commerce platform.

Reference is now made to FIG. 9, which shows, in flowchart form, an example method 900 for providing product data to a merchant via an e-commerce platform. The method 900 may be implemented by an e-commerce platform, such as e-commerce platform 300 (FIG. 3). In at least some embodiments, the method 900 may be at least partially implemented by one or more components of a commerce management engine of the platform, such as the VPDM module 302 of FIG. 3. The platform may perform the operations of method 900 in a process for presenting, to merchant devices, recommendations for transfer values of a product item in one or more geographical regions where the product may be offered for sale on the platform. The operations of method 900 may be performed in addition to or as alternatives to one or more of the operations of method 700 of FIG. 7 and method 800 of FIG. 8.

In operation 902, the platform determines, for a selected geographical region, recommended transfer value data for a product. The recommended transfer value data indicates, at least, a recommended product value and a recommended shipping rate for the product. The recommendation for the transfer value data may be derived in accordance with any one of the techniques described above with respect to methods 700 and 800.

In operation 904, the platform transmits the recommended transfer value data to the merchant device. For example, the recommended transfer value data may be provided via a user interface for the platform that is accessible using the merchant device. The merchant may provide feedback or response to the recommendations from the platform. More particularly, the platform receives input from the merchant device in response to the recommendation, in operation 906.

The platform determines, in operation 908, whether the received input indicates approval of the recommended transfer value data. If the input indicates approval, the platform provides, via a user interface associated with the platform, product data for the product item for the geographical region based on the approved recommendation of transfer value data, in operation 914. For example, the product value and the shipping rate indicated in the recommended transfer value data may be presented on a product website for the product item (and more generally, in the merchant's online store).

If, on the other hand, the input does not indicate approval of the recommendation, the platform determines whether the input represents a request to make changes to the initial recommendation, in operation 910. The merchant may not accept the particular recommendation of the platform, but may request adjustments to the recommendation which may be deemed by the merchant to be acceptable. The requested change may, for example, be a change of value for one or more of the variables included in the transfer value date. If the input is determined to include requested changes to the initial recommendation, the platform makes those changes that are requested to the recommendation, in operation 912.

If the input does not indicate approval of the initial recommendation and no changes to the recommendation are expressly requested in the input, the method 900 returns to operation 902 to determine a different recommendation for transfer value data for the product item.

IMPLEMENTATIONS

The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In some embodiments, the process may be a dual core processor, quad core processors, other chip-level multiprocessor and the like that combine two or more independent cores (called a die).

The methods and systems described herein may be deployed in part or in whole through a machine that executes computer software on a server, cloud server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented in different devices which may operate in wired or wireless networks. Examples of wireless networks include 4th Generation (4G) networks (e.g. Long Term Evolution (LTE)) or 5th Generation (5G) networks, as well as non-cellular networks such as Wireless Local Area Networks (WLANs). However, the principles described therein may equally apply to other types of networks.

The operations, methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices.

The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another, such as from usage data to a normalized usage dataset.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The invention claimed is:

1. A computer-implemented method for generating transfer values for product items associated with merchant accounts, the method comprising:
   receiving, from a merchant device associated with a merchant account, input of product value data for a product item and a data modifier for the product value data, the data modifier identifying a target margin value associated with the product item;
   determining at least one current inventory location for the product item based on tracking data associated with inventory of the product item;
   receiving, via a computing device, a request to retrieve transfer value data for the product item, the request comprising an HTTP request to retrieve page data for a merchant online storefront;
generating a response to the HTTP request, the generating including:
determining a current device location associated with the computing device based on at least one of an IP address associated with an originating device of the HTTP request or user account data of a customer associated with the computing device;
determining that the current device location is within a defined geographical region;
obtaining a shipping rate associated with shipping the product item to the geographical region from the at least one current inventory location based on making calls to APIs associated with shipping providers indicating at least the current device location and the at least one current inventory location;
retrieving, from memory, historical transfer value preference data for the geographical region indicating historical preference of customers associated with the geographical region with respect to transfer value of products;
modifying at least one of the product value data, the shipping rate, or the target margin value based on the historical transfer value preference data retrieved;
determining a transfer value of the product item for the geographical region based on the modified at least one of the product value data, the shipping rate, or the target margin value;
generating an indication of the transfer value of the product item for the geographical region; and
providing the response to the HTTP request, the response including an indication of the transfer value of the product item for the geographical region.

2. The method of claim 1, further comprising, receiving, from the merchant device, user input identifying the geographical region.

3. The method of claim 1, wherein modifying at least one of the product value data, the shipping rate, or the target margin value comprises determining adjusted product value data for the product item and an adjusted shipping rate for the product item based on the historical transfer value preference data for the geographical region.

4. The method of claim 3, further comprising determining an amount of increase in product value of the product item and an amount of decrease in shipping rate for the product item.

5. The method of claim 3, wherein the historical transfer value preference data indicates a tolerance range for a shipping rate for the product item, and wherein the adjusted shipping rate is determined based on the tolerance range for the shipping rate.

6. The method of claim 1, wherein the historical transfer value preference data indicates a preferred representation of transfer values in terms of constituent components, wherein the indication of the transfer values is displayed on the computing device in accordance with the historical transfer value preference data.

7. The method of claim 1, further comprising: retrieving, from a database, transfer value preference data for a plurality of defined geographical subregions, wherein the geographical region comprises a grouping of the plurality of defined geographical subregions based on the transfer value preference data.

8. The method of claim 1, wherein obtaining the shipping rate comprises querying a database to retrieve a real-time shipping rate associated with shipping the product item to the geographical region.

9. The method of claim 1, wherein modifying at least one of the product value data, the shipping rate, or the target margin value comprises determining adjustments to a product value of the product item for complying with the target margin value associated with the product item.

10. A computer system comprising:
a processor; and
a memory storing computer-executable instructions that, when executed by the processor, are to cause the processor to:
receive, from a merchant device associated with a merchant account, input of product value data for a product item and a data modifier for the product value data, the data modifier identifying a target margin value associated with the product item;
determine at least one current inventory location for the product item based on tracking data associated with inventory of the product item;
receive, via a computing device, a request to retrieve transfer value data for the product item, the request comprising an HTTP request to retrieve page data for a merchant online storefront;
generate a response to the HTTP request, the generating including:
determining a current device location associated with the computing device based on at least one of an IP address associated with an originating device of the HTTP request or user account data of a customer associated with the computing device;
determining that the current device location is within a defined geographical region;
obtaining a shipping rate associated with shipping the product item to the geographical region from the at least one current inventory location based on making calls to APIs associated with shipping providers indicating at least the current device location and the at least one current inventory location;
retrieving, from memory, historical transfer value preference data for the geographical region indicating historical preference of customers associated with the geographical region with respect to transfer value of products;
modifying at least one of the product value data, the shipping rate, or the target margin value based on the historical transfer value preference data retrieved;
determining a transfer value of the product item for the geographical region based on the modified at least one of the product value data, the shipping rate, or the target margin value;
generating an indication of the transfer value of the product item for the geographical region; and
providing the response to the HTTP request, the response including an indication of the transfer value of the product item for the geographical region.

11. The system of claim 10, wherein the instructions, when executed, are to further cause the processor to receive, from the merchant device, user input identifying the geographical region.

12. The system of claim 10, wherein modifying at least one of the product value data, the shipping rate, or the target margin value comprises determining adjusted product value data for the product item and an adjusted shipping rate for the product item based on the historical transfer value preference data for the geographical region.

13. The system of claim 12, wherein the instructions, when executed, are to further cause the processor to determine an amount of increase in product value of the product item and an amount of decrease in shipping rate for the product item.

14. The system of claim 12, wherein the historical transfer value preference data indicates a tolerance range for a shipping rate for the product item, and wherein the adjusted shipping rate is determined based on the tolerance range for the shipping rate.

15. The system of claim 10, wherein the historical transfer value preference data indicates preferred representation of transfer values in terms of constituent components, wherein the indication of the transfer values is displayed on the computing device in accordance with the historical transfer value preference data.

16. The system of claim 10, wherein the instructions, when executed, are to further cause the processor to retrieve, from a database, transfer value preference data for a plurality of defined geographical subregions, wherein the geographical region comprises a grouping of the plurality of defined geographical subregions based on the transfer value preference data.

17. The system of claim 10, wherein obtaining the shipping rate comprises querying a database to retrieve a real-time shipping rate associated with shipping the product item to the geographical region.

18. The system of claim 10, wherein modifying at least one of the product value data, the shipping rate, or the target margin value comprises determining adjustments to a product value of the product item for complying with the target margin value associated with the product item.

19. A non-transitory processor-readable medium storing computer-executable instructions that, when executed by a processor, are to cause the processor to:

receive, from a merchant device associated with a merchant account, input of product value data for a product item and a data modifier for the product value data, the data modifier identifying a target margin value associated with the product item;

determine at least one current inventory location for the product item based on tracking data associated with inventory of the product item;

receive, via a computing device, a request to retrieve transfer value data for the product item, the request comprising an HTTP request to retrieve page data for a merchant online storefront;

generate a response to the HTTP request, the generating including:

determining a current device location associated with the computing device based on at least one of an IP address associated with an originating device of the HTTP request or user account data of a customer associated with the computing device;

determining that the current device location is within a defined geographical region;

obtaining a shipping rate associated with shipping the product item to the geographical region from the at least one current inventory location based on making calls to APIs associated with shipping providers indicating at least the current device location and the at least one current inventory location;

retrieving, from memory, historical transfer value preference data for the geographical region indicating historical preference of customers associated with the geographical region with respect to transfer value of products;

modifying at least one of the product value data, the shipping rate, or the target margin value based on the historical transfer value preference data retrieved;

determining a transfer value of the product item for the geographical region based on the modified at least one of the product value data, the shipping rate, or the target margin value;

generating an indication of the transfer value of the product item for the geographical region; and providing the response to the HTTP request, the response including an indication of the transfer value of the product item for the geographical region.

20. The processor-readable medium of claim 19, wherein the instructions, when executed, are to further cause the processor to receive, from the merchant device, user input identifying the geographical region.

\* \* \* \* \*